Sept. 9, 1969          A. C. MONAGHAN          3,465,489
METHOD AND APPARATUS FOR HEAT SEALING AND CUTTING FILM
Filed June 30, 1965          12 Sheets-Sheet 1
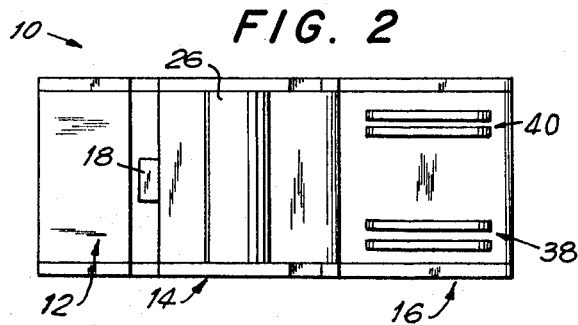
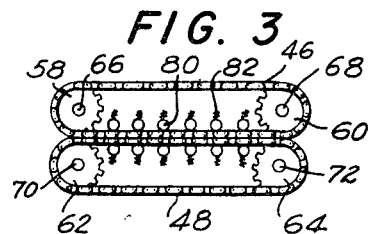
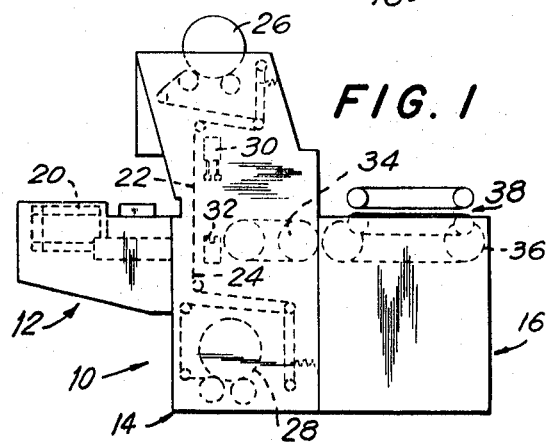
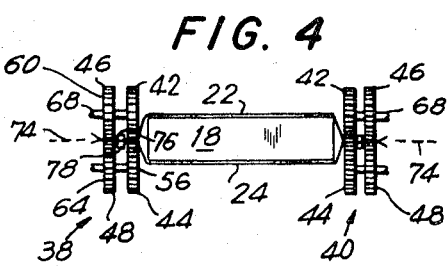
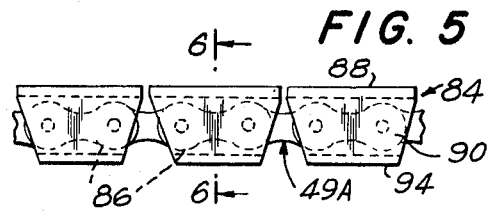
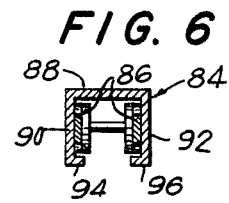
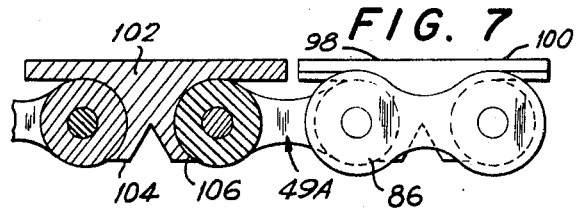
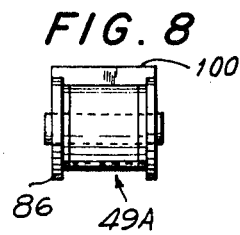
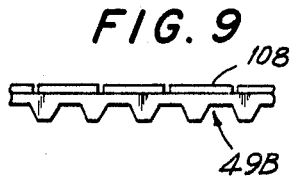
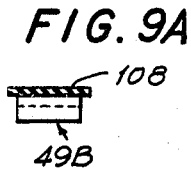
INVENTOR.
ALFRED C. MONAGHAN
BY Harry Cohn
ATTORNEY

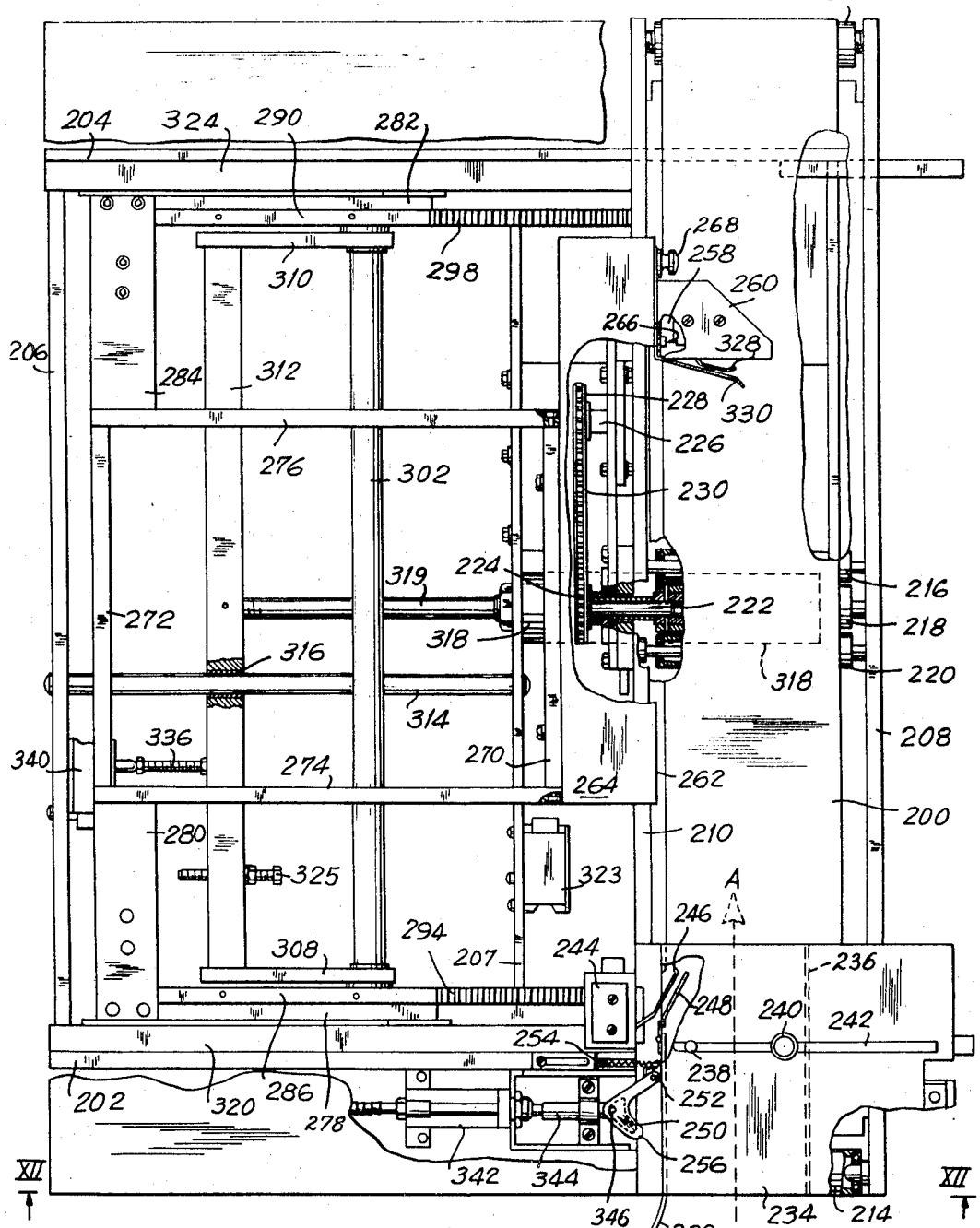

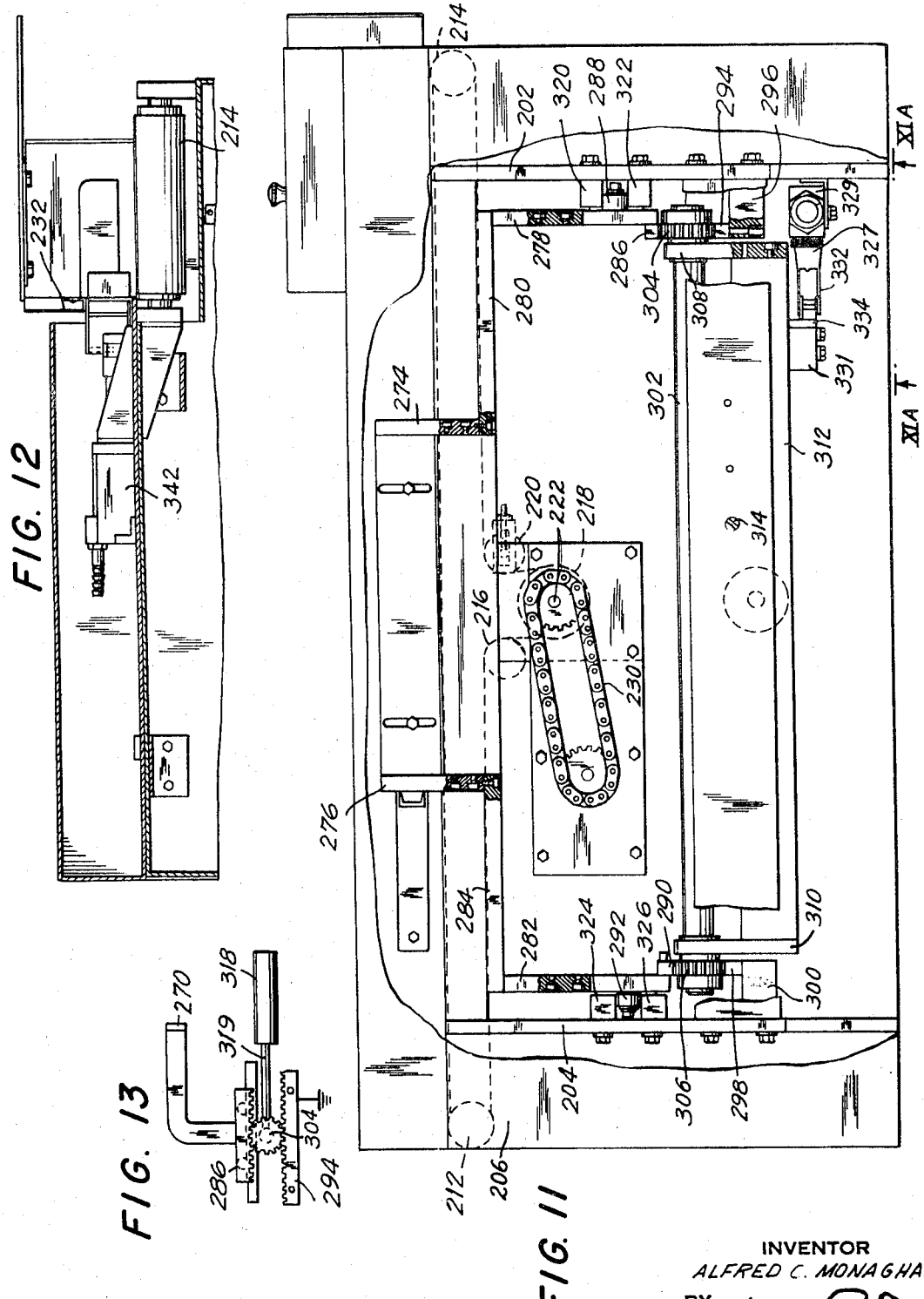

Sept. 9, 1969     A. C. MONAGHAN     3,465,489

METHOD AND APPARATUS FOR HEAT SEALING AND CUTTING FILM

Filed June 30, 1965     12 Sheets-Sheet 4

INVENTOR.
ALFRED C. MONAGHAN

BY

ATTORNEY

INVENTOR
ALFRED C. MONAGHAN
BY
ATTORNEY

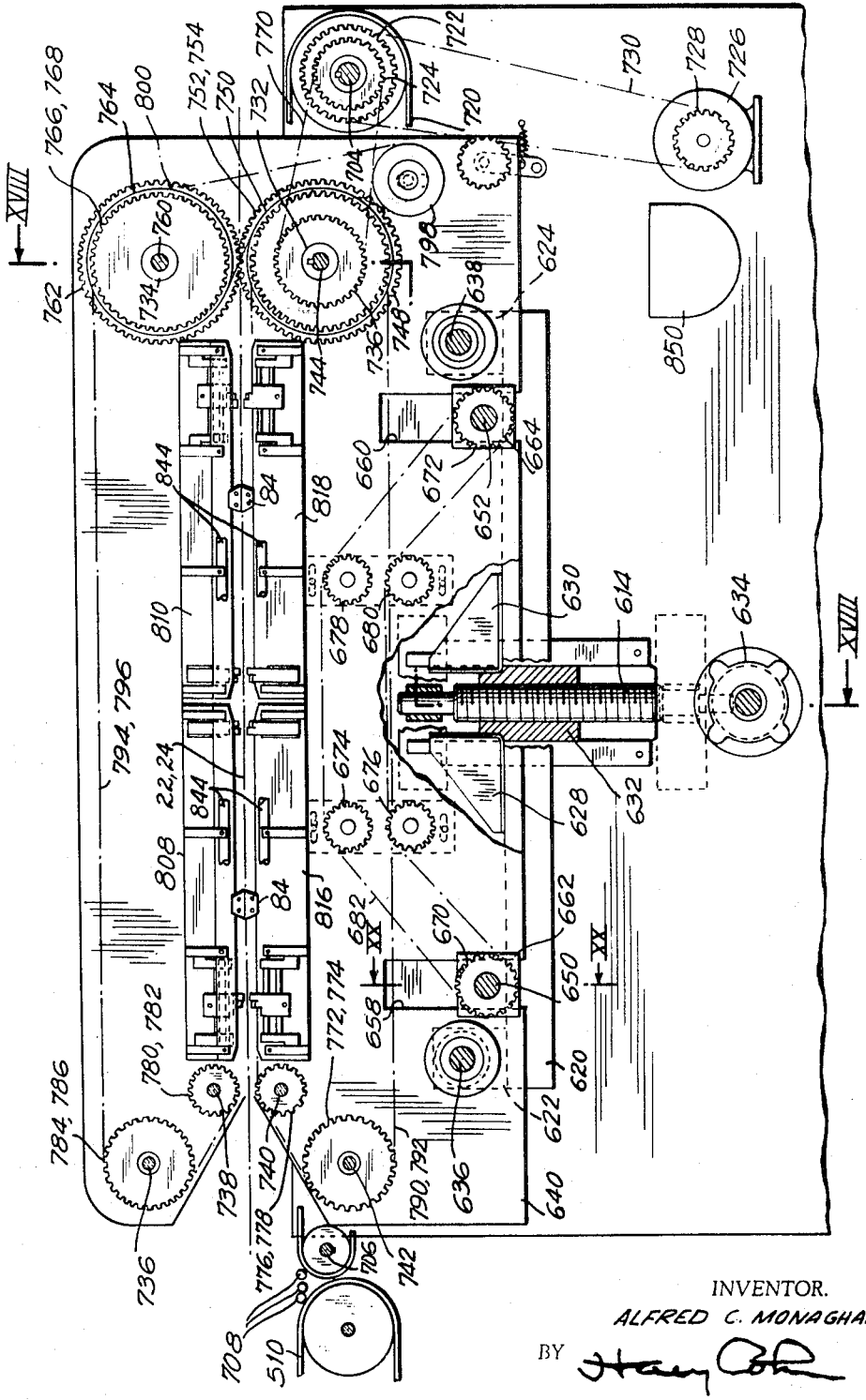

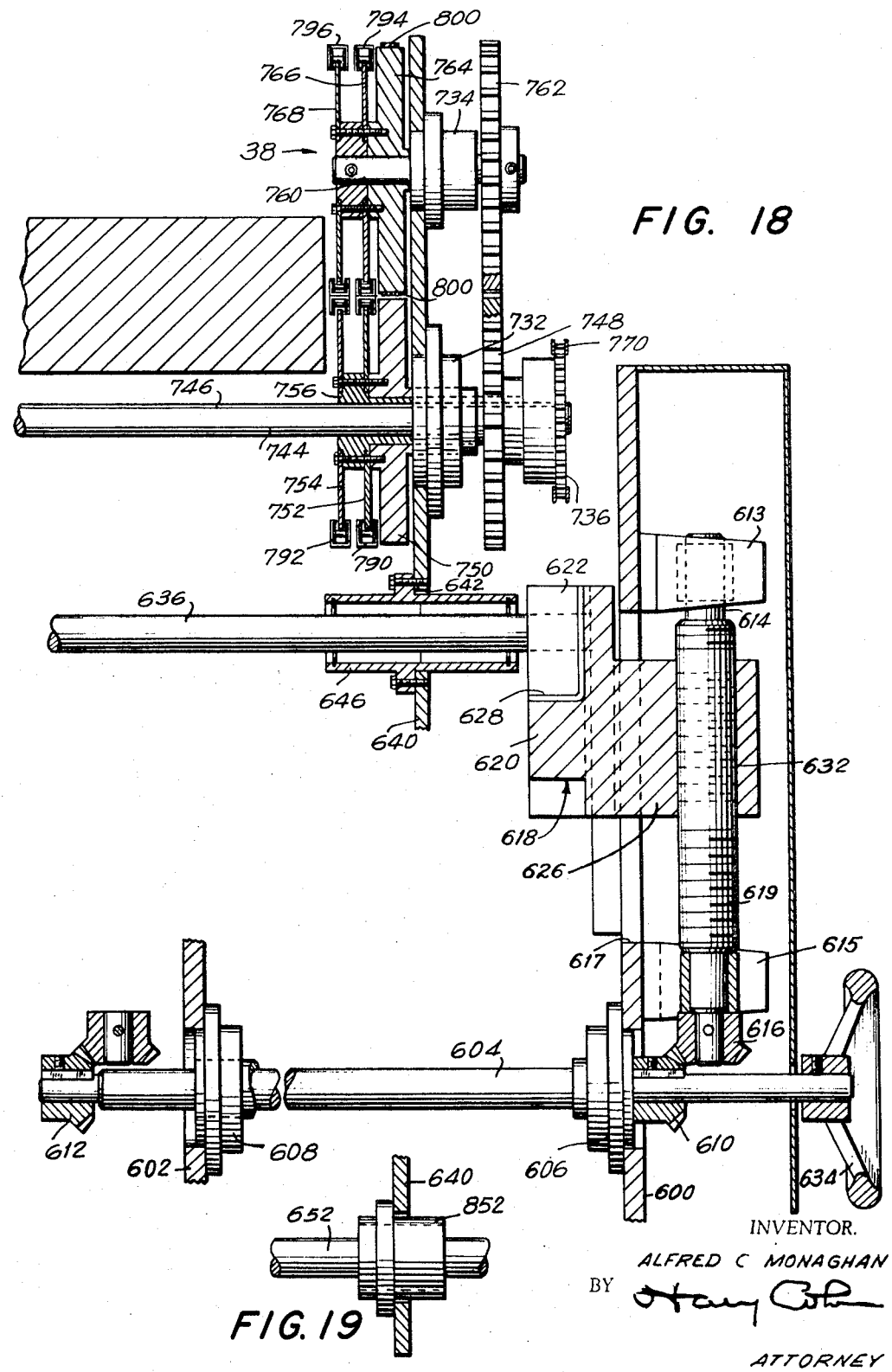

Sept. 9, 1969  A. C. MONAGHAN  3,465,489
METHOD AND APPARATUS FOR HEAT SEALING AND CUTTING FILM
Filed June 30, 1965  12 Sheets-Sheet 8
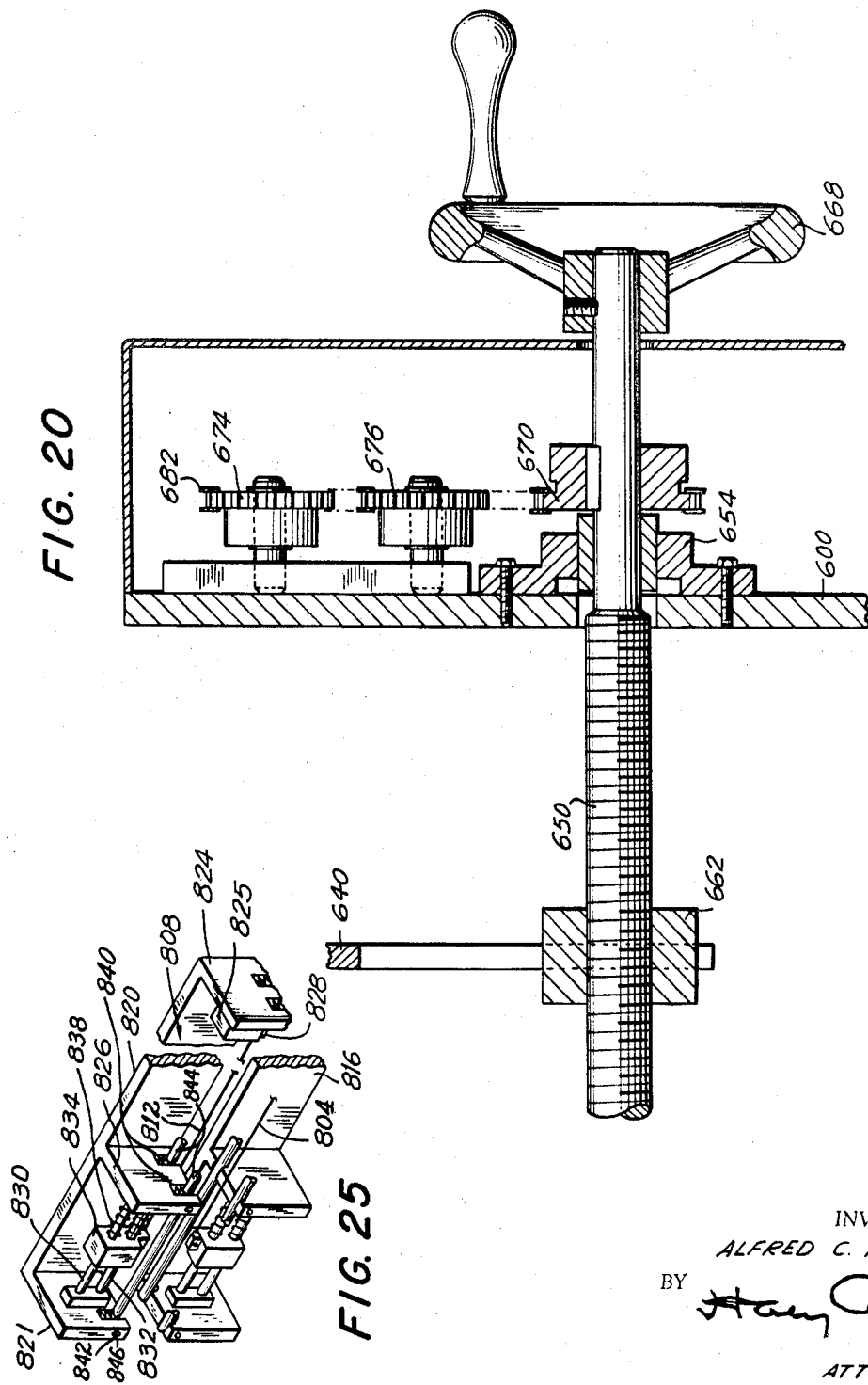
INVENTOR.
ALFRED C. MONAGHAN
BY
ATTORNEY

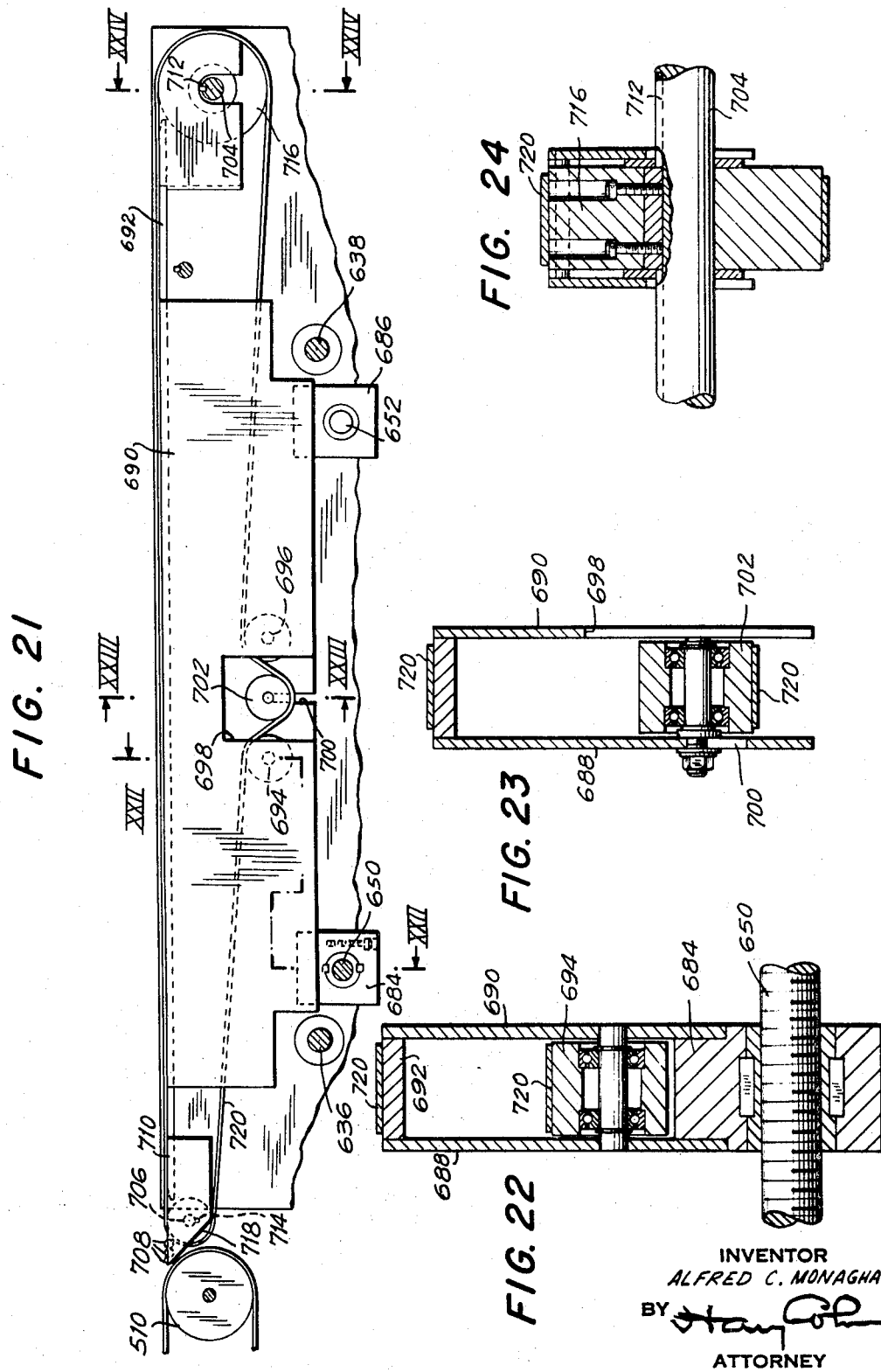

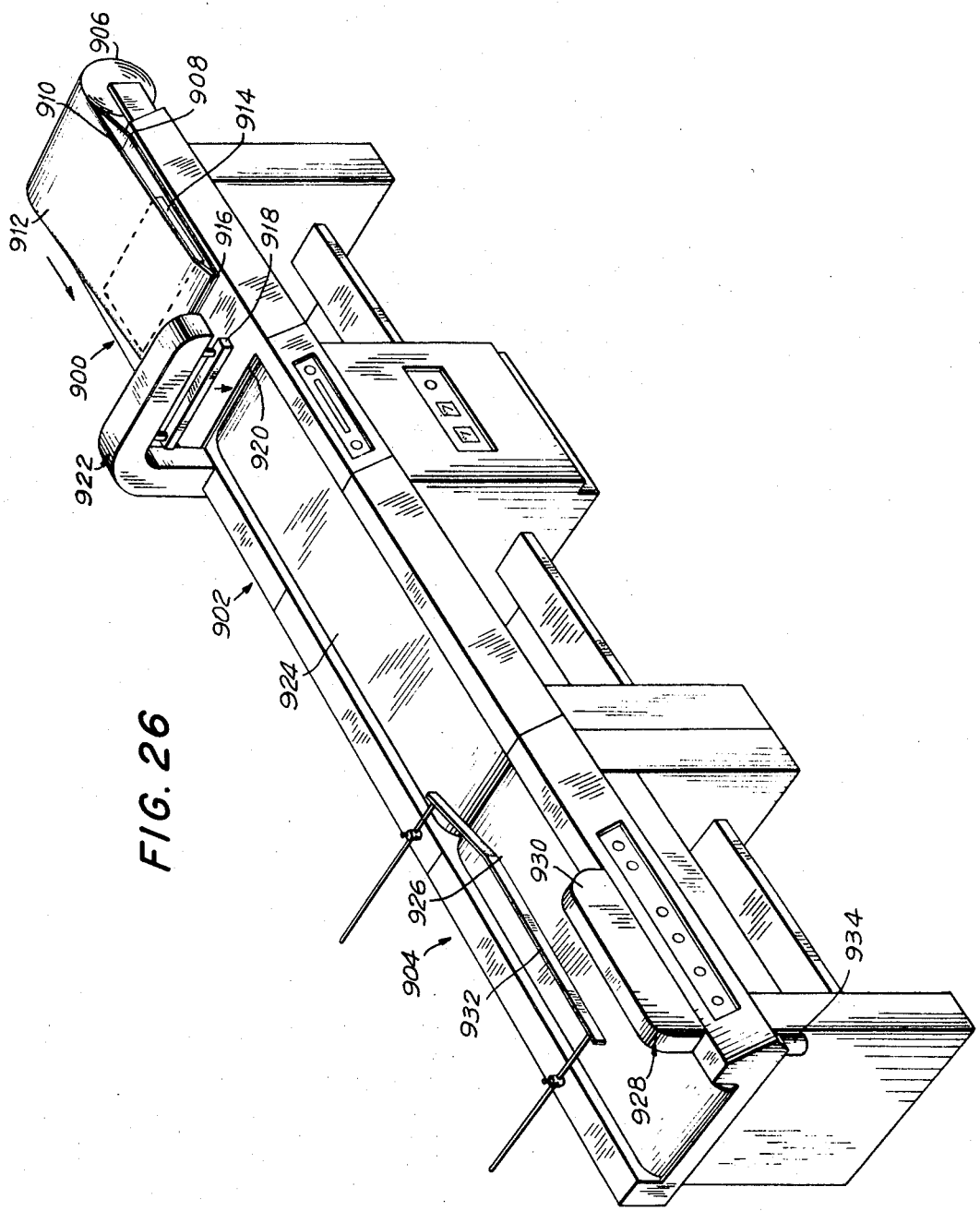

Sept. 9, 1969  A. C. MONAGHAN  3,465,489
METHOD AND APPARATUS FOR HEAT SEALING AND CUTTING FILM
Filed June 30, 1965  12 Sheets-Sheet 11
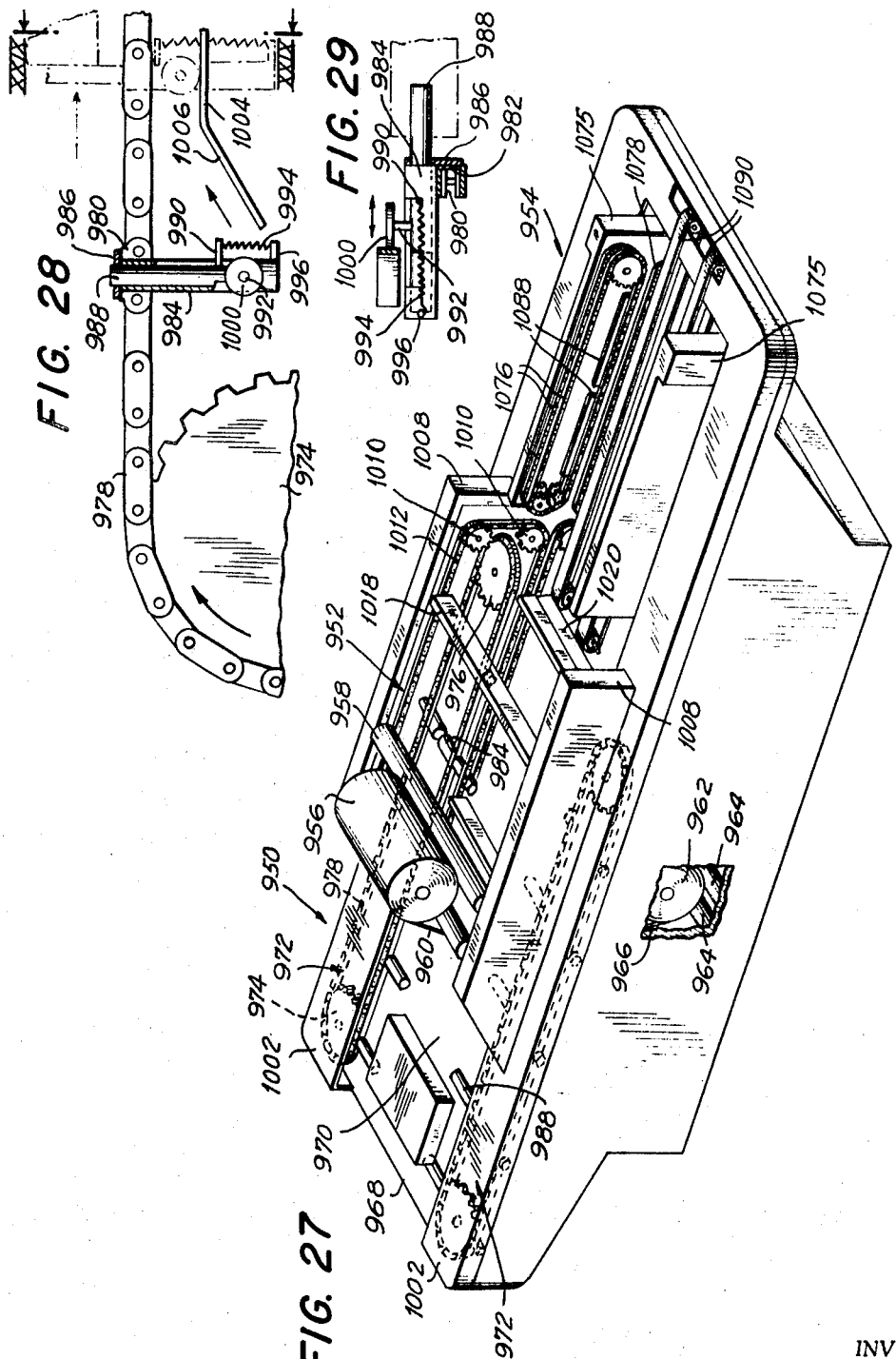
INVENTOR.
ALFRED C. MONAGHAN
BY
ATTORNEY

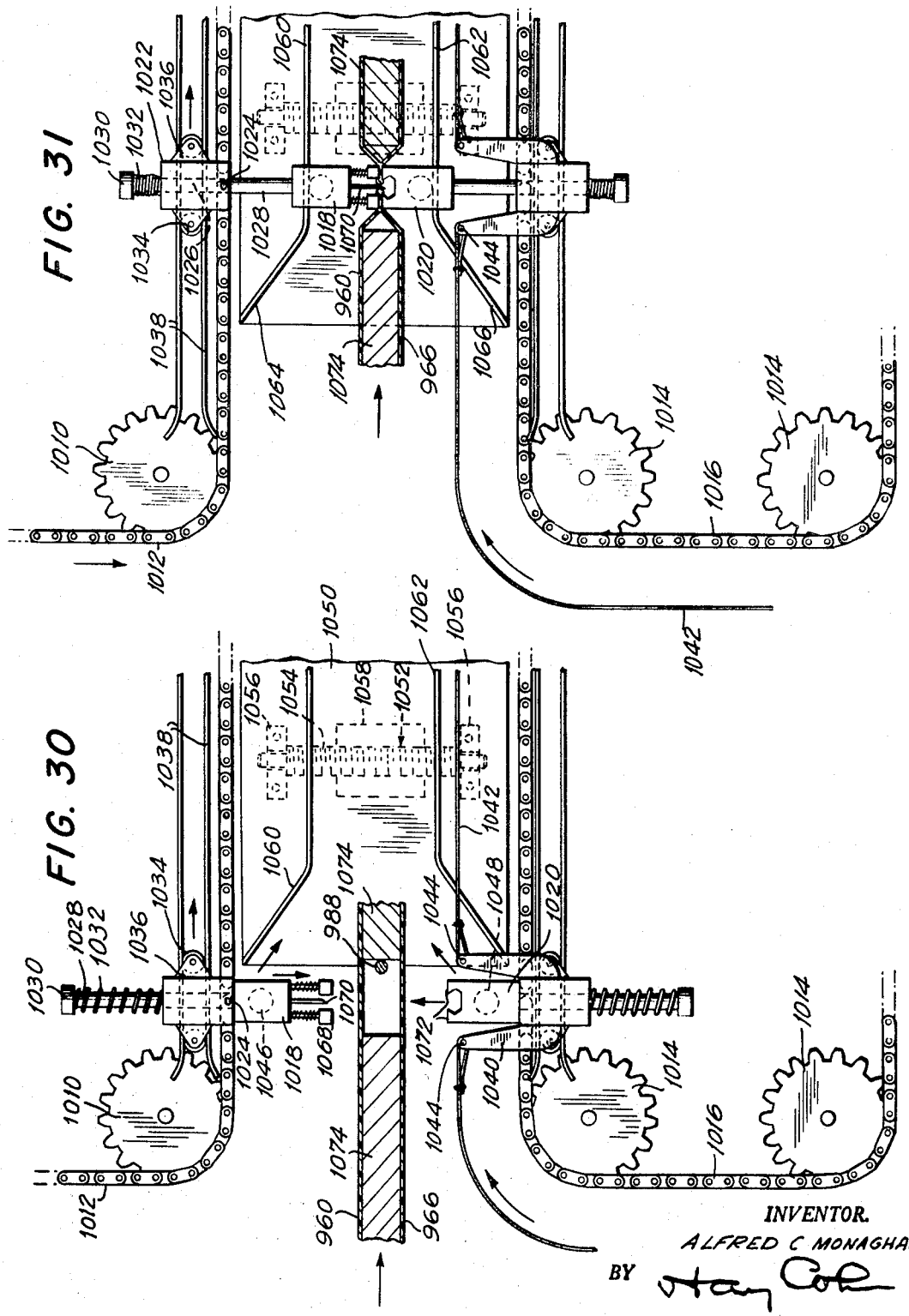

United States Patent Office 3,465,489
Patented Sept. 9, 1969

3,465,489
METHOD AND APPARATUS FOR HEAT SEALING
AND CUTTING FILM
Alfred C. Monaghan, Warren Township, Plainfield,
N.J., assignor to Weldotron Corporation, Newark,
N.J., a corporation of New Jersey
Filed June 30, 1965, Ser. No. 468,331
Int. Cl. B65b 9/02, 51/30
U.S. Cl. 53—28                                    19 Claims

ABSTRACT OF THE DISCLOSURE

A packaging machine sequentially seals successive articles between two webs of thermoplastic film as the articles and the webs are advanced along the machine direction axis. Initially the two webs are sealed together between successive articles along the cross web axis, and subsequently the two webs are progressively sealed along the machine direction axis as both the article and the webs advance therealong. This progressive sealing is provided by opposed pairs of cap-blocked roller sprocket chains which grasp the superposed margins of the webs and carry them past a radiant heater. Three species of apparatus for providing the cross-web axis seal are shown: (1) an automatically operated, intermittent feed apparatus; (2) a manually operated, intermittent feed apparatus; and (3) an automatically operated, progressive feed apparatus.

---

This invention relates to methods and apparatuses for the radiant heat cutting and sealing of superposed layers of theremoplastic film; and, more particularly, but not exclusively, to the packaging of articles between two layers of film.

The packaging of articles between two layers of film is well known. Cus'omarily, the article is disposed between two webs of film which have previously been joined together along the cross-web-direction axis adjacent the leading end of the article. Subsequently, while the article is stationary, the two webs are joined together adjacent each side of the article along the machine-direction axis by bar type sealers of a fixed length, which sealers make a seal of a fixed length. Finally, or concurrently with the side sealing operation, but while the article is stationary, the two webs are joined together along the cross-web-axis adjacent the trailing end of the article. As an expedient to reduce the two side sealers required to one, the two webs may be formed by folding a single web along the machine-direction axis to provide an inherent side seal along the fold line. Such machines are shown in U.S. Patent No. 3,135,077, issued June 2, 1964 to Martin Siegel et al., and in U.S. Patent No. 3,158,973, issued Dec. 1, 1964 to me.

The length of the article to be packaged in the machine direction is limited by the length of the bar type sealers used to seal the webs adjacent to the sides of the article. If the bars are shorter than the article, then either the sides of the package will not be fully sealed, or the sides will have to be sealed in several steps, requiring an accurate repositioning of the article therebetween. If the bars are longer than the article, then the sides of the package will be fully sealed, but there will at least be a waste of power for heating the surplus bar length, and there may be wastage of the webs.

It is, therefore, an object of this invention to provide a radiant heat cutting and sealing machine which will efficiently package articles of any length along the machine direction axis.

It is another feature of this invention to provide a machine which requires a minimum of time during which the article is stationary during the course of the packaging operation.

It is a further object of this invention to provide a machine which is highly adapted to the automatic, high speed packaging of articles.

A feature of this invention is the provision of a sealer which continuously seals a package along the machine-direction axis as the package moves in the machine-direction, by positively and synchronously advancing the article and the webs past a heat source.

Another feature of this invention is the provision of a machine which combines an intermittent cross-web-axis sealer with a continuous machine-direction-axis side sealer to fully wrap an article.

Yet another feature of this invention is the provision of a cross-web-axis sealer which seals as the package moves continuously in the machine direction.

Still another feature of this invention is the provision of a machine which combines a cross-web-axis sealer and a machine-direction-axis sealer to fully wrap an article as the package moves continuously in the machine direction.

Yet another feature of this invention is the initial packaging of an article in a sleeve of thermoplastic material which is sealed along the cross-web-axis adjacent the leading and trailing edges of the article, and the subsequent continuous sealing in the machine direction of any open sides of this sleeve adjacent the sides of the article as the article advances in the machine direction.

Still another feature of this invention is the provision of a continuous sealer which produces a hairline seal adjacent the side of the article and which positively removes any marginal scrap from the webs adjacent the seal.

Even another feature of this invention is the provision of a conveyor belt of composite structure having a first portion which is positively and synchronously driven without slippage, and a second portion which is self releasing or nonadhesive to most molten plastics.

These and other objects, features and advantages will become apparent upon consideration of the following detailed description, with reference to the drawing in which:

FIG. 1 is a side view in elevation of a first embodiment of this invention;

FIG. 2 is a top view in plan of the machine of FIG. 1;

FIG. 3 is a side view in elevation of a detail of the machine of FIG. 1, showing the principle of the continuous machine direction sealer;

FIG. 4 is an end view in elevation of the continuous machine direction sealer of FIG. 3;

FIG. 5 is a side view in elevation of a detail of the sealer of FIG. 3, showing a first embodiment of a web conveyor;

FIG. 6 is an end view in elevation of the structure of FIG. 5;

FIG. 7 is a side view in elevation of a detail of the sealer of FIG. 3, showing a second embodiment of a web conveyor;

FIG. 8 is an end view in elevation of the structure of FIG. 7;

FIG. 9 is a side view in elevation of a detail of the sealer of FIG. 3, showing a third embodiment of a web conveyor;

FIG. 9A is an end view in elevation of the structure of FIG. 9;

FIG. 10 is an end view in elevation of the module of the machine of FIG. 1;

FIG. 11 is an end view in elevation of the module of FIG. 10 taken partially broken away by the plane XI—XI;

FIG. 11A is a bottom plan view of the module of FIG. 11;

FIG. 12 is a side view in elevation of a detail of the module of FIG. 10 taken in section along the plane XII—XII;

FIG. 13 is a schematic view in elevation showing the principle of the double rack and common pinion drive for the article pusher mechanism of FIG. 10;

FIG. 17 is a side view in elevation of the continuous machine axis sealer module of FIG. 1;

FIG. 18 is an end view in elevation of a detail of FIG. 17, showing the mechanism for traversing the continuous sealer mechanism along the vertical axis;

FIG. 19 is an end view in elevation of a detail of FIG. 17, showing a resilient bushing;

FIG. 20 is an end view in elevation of a detail of FIG. 17, showing the mechanism for traversing the continuous sealer mechanism and the article support-conveyor mechanism along the cross-web axis;

FIG. 21 is a side view in elevation, partially broken away, of the module of FIG. 17, showing the article support conveyor;

FIG. 22 is an end view in elevation of FIG. 21 taken in section along the plane XXII—XXII;

FIG. 23 is an end view in elevation of FIG. 21 taken in section along the plane XXIII—XXIII;

FIG. 24 is an end view in elevation of FIG. 21 taken in section along the plane XXIV—XXIV;

FIG. 25 is a perspective view of a detail of FIG. 17, showing the mounting mechanism for the radiant heating elements, and the pressure applying mechanism for a web conveyor;

FIG. 26 is a perspective view of a second embodiment of this invention showing a manually loaded and advanced packaging machine;

FIG. 27 is a perspective view of a third embodiment of this invention, showing an automatically advanced packaging machine, which is non-intermittent in its advance of the article;

FIG. 28 is a top view in plan of a detail of FIG. 27, showing the mechanism for controlling the extension and retraction of the article advancing flights, of which one flight is shown retracted;

FIG. 29 is an end view in elevation of a detail of FIG. 28 showing a flight extended;

FIG. 30 is a side view in elevation of a detail of FIG. 27, showing a cross-web sealer mechanism before sealing; and FIG. 31 is a side view in elevation of FIG. 30, showing the sealer mechanism during sealing while the article is advancing in the machine direction.

Figure 14:
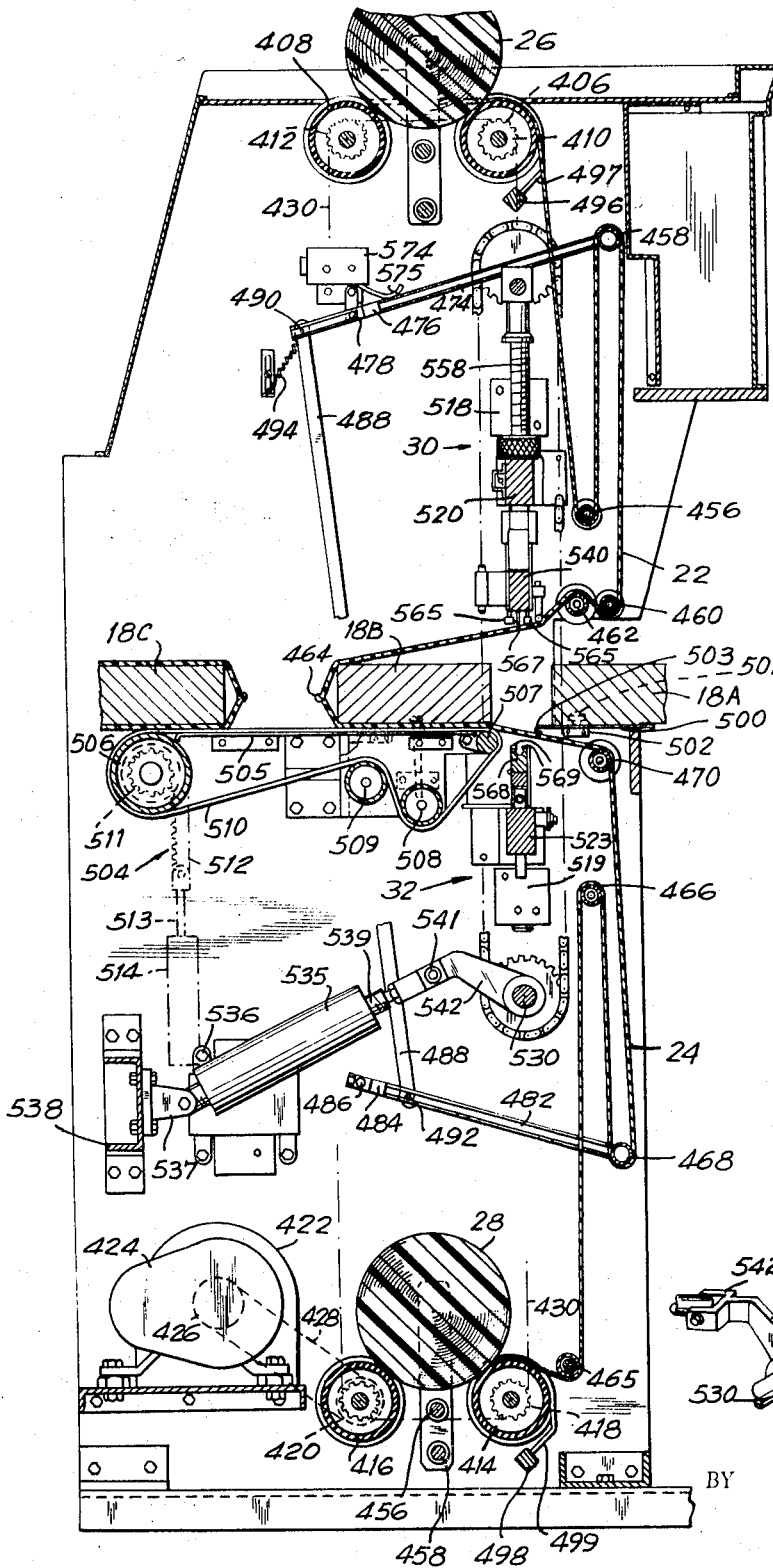
FIG. 14 is a side view in elevation of the cross-web axis sealer module of FIG. 1, taken in section along the plane XIV—XIV of FIG. 16.

The first embodiment of FIGS. 1 through 25

Turning now to the drawing, a first embodiment of this invention is shown in FIG. 1 as a machine 10 which provides for the automatic advance and packaging of an article. The machine 10 is formed of three modules: an intermittently operated article infeed module 12, an intermittently operated cross-web axis sealer module 14 and a continuously operated machine-axis sealer module 16. If desired, but not here shown, a shrink tunnel may be provided downstream in the machine direction from the continuous sealer module 16. The machine direction is the direction of advance of the articles through the machine while being wrapped.

The function of the infeed module 12 is to receive articles sequentially from an outside source, such as a supply conveyor, a chute, or by manual delivery, and to advance the article 18 in the machine direction into the intermittently operated, cross-web axis sealer module 14 by means of an article pusher assembly 20. In the cross-web axis sealer module 14, the article 18 is disposed between two webs 22 and 24, which have been previously sealed together along the cross-web axis by the packaging operation for the next preceding article, and is advanced to engage its leading end against this cross-web axis seal, drawing the two webs along therewith, which webs unwind from an upper supply roll 26 and a lower supply roll 28, respectively.

When the article has been advanced downstream of the cross-web axis sealer which consists of an upper bar assembly 30 and a lower bar assembly 32, the pusher assembly retracts back into the infeed module 12, and the upper and the lower bar assemblies are brought together adjacent the trailing edge of the article. The cross-web axis sealer advantageously may be of the type shown in U.S. Patent No. 3,321,353, issued to Seymour Zelnick on May 23, 1967. Such a sealer initially clamps together portions of the two webs along the cross-web axis, and subsequently heats these portions to melt a gap into the webs along the cross-web axis and to seal together the edges of the two webs bounding this gap. In this manner, the two webs are sealed together along the trailing end of the article, the portions of the web used to package the article are separated from the supply portions of these webs, and the leading edges of the supply portions of these two webs are sealed together to receive the next succeeding package.

After the cross-web axis seal has been made, an intermittently operated conveyor assembly 34 advances the article, which is now wrapped end to end in a sleeve of plastic web, to the non-intermittent machine axis sealer module 16. This module 16 includes a conveyor assembly 36 which supports and advances the article through the module. Two continuous sealer assemblies 38 and 40 are disposed along the left and the right sides of the conveyor assembly 36 respectively.

Each continuous sealer assembly includes an inner upper conveyor belt 42, an inner lower conveyor belt 44, an outer upper conveyor belt 46, and an outer lower conveyor belt 48. These belts are provided with a toothed driven surface for driven engagement with a toothed driving surface to insure positive synchronous drive. These belts may comprise an endless loop of sprocket chain 49A, as shown in detail in FIGS. 5 and 7; or an endless loop of timing belt 49B, as shown in detail in FIG. 9. The belt 42 passes over two spaced apart pinions, not visible; similarly the belt 44 has two pinions, one not visible, and 56, the belt 46 has two pinions 58 and 60, and the belt 48 has two pinions 62 and 64. The pinions, one not visible, and 58 are spaced apart and fixed on a shaft 66. The pinions, one not visible, and 60 are spaced apart and fixed on a shaft 68. The pinions, one not visible, 62 are spaced apart and fixed on a common shaft 70. The pinions 56 and 64 are spaced apart and fixed on a common shaft 72. These shafts are mounted in suitable bearings and driven in synchronism so that the lower run of the belt 42 abuts the upper run of the belt 44, and the lower run of the belt 46 abuts the upper run of the belt 48, to provide a common plane of abutment 74, and all of these belts advance in synchronism.

An elongated, taut, electrically powered, radiant heating element 76 is fixed between the conveyors 42 and 46 spaced slightly above and parallel to the common plane of abutment 74, and a similar element 78 is fixed between the conveyors 44 and 48 spaced slightly below and parallel to the common plane of abutment 74. The abutting runs of the conveyors are advantageously biased against each other by suitable back-up members, here shown for example as a plurality of small pinions 80, which are mounted in spring loaded bearings 82.

After the article 18 has been wrapped in a sleeve comprising a portion of the upper web 22 and a portion of the lower web 24 including seals along the cross-web axis adjacent the leading and the trailing ends of the article, it is delivered to the conveyor 36, which carries and supports the article between the left and the right continuous sealer assemblies 38 and 40 and when the article and its sleeve enter between the continuous sealer assemblies, the left marginal side portions of the upper and the lower webs are seized and clamped between the upper and the lower conveyor belts of the left assembly 38, and the right marginal side portions of these webs are seized and clamped between the upper and the lower conveyor belts of the right assembly 40. These clamped marginal portions are conveyed between the radiant heater elements 76 and 78 which melt a gap into the two webs of thermoplastic material and fuse together the edges of the webs bounding this gap. This technique is disclosed in U.S. Patent No. 3,243,330, to Seymour Zelnick, issued Mar. 29, 1966. In this manner, the sides of the sleeve wrapped end-to-end around the article are sealed continuously, as the article and its sleeve are conveyed through the continuous, machine axis sealer module 16, and the marginal portions of the webs which are exterior, or distal, to the seal, are severed from the sealed package.

The conveyor belts of the continuous sealer assemblies

It is quite important for the optimum strength of the seals or joints between the superposed webs that there be no relative slip between any of the four conveyor belts and the two seized and clamped therebetween webs as these webs are conveyed between the heater elements. If there is any relative movement between these two superposed webs, there will be poor, if any, adhesion between the melted portions of these webs, and a very poor, if any, resulting seal.

Further, the web clamping surfaces of these belts should be heat resistant, and self releasing from the molten plastic, which is to say, it should not stick.

I have found that these results can be obtained by providing the conveyor belts with a driven surface which can be positively driven without slippage, and with a clamping surface which is heat resistant and self-releasing.

In FIGS. 5 and 6, a plurality of cap blocks 84 are respectively snapped over the alternate outer link-pairs 86 of a roller-sprocket chain. The chain and the caps serve as the conveyor belts for the continuous sealer assemblies. Each of the cap blocks 84 has a rectangular base portion 88, whose outer surface serves as the clamping surface. The base portion is integral with two trapezoidal side portions 90 and 92 respectively, which terminate in opposed finger portions 94 and 96, which snap behind the link-pair to hold the cap block to the link-pair. The trapezoidal shape of the side portions permits the cap blocks to be closely spaced along the length of the chain, one per outer link-pair 86, and yet to pass around the sprocket wheel.

In FIGS. 7 and 8 a plurality of cap blocks 98 are respectively snapped within the alternate outer link-pairs 86. Each of the cap blocks 98 has a rectangular head portion 100 which is integral with a central stem portion 102 which terminally bifurcates into two finger portions 104 and 106. The underside of the head portion and of the stem portion are reduced in width to fit between the inner surfaces of the outer link-pair, while the head portion rides on the edges of the outer link-pair. This cap block 98 is sturdier than the cap block 84 and requires smaller marginal portions of web for clamping, thereby reducing the wastage of film during the continuous sealing operation.

In FIGS. 9 and 9A, the conveyor belt is formed of a standard timing belt 49B with thin rectangular cap blocks 108 bonded directly to the belt 49B to provide the clamping surface. This embodiment is the least costly to manufacture of the three embodiments shown here.

The cap blocks 84, 98 and 108 are advantageously made of a fluorinated hydrocarbon plastic, such as is sold under the trademark "Teflon" to provide the desired high temperature resistance and self-releasing characteristic. Depending on the particular plastic from which the webs are formed, various silicon rubbers, "Delrin" or stainless steel may also have an adequate self-releasing, or nonsticking characteristic.

Thus the composite conveyor belt is provided with a positively drivable without slippage surface formed by either the roller chain or the timing chain, and with a high temperature resistant, self-releasing surface formed by either cap blocks 84, 98 and 108.

The infeed module of FIGS. 10 through 13

A commercial embodiment of the infeed module 12 is shown in FIGS. 10 through 13. As seen in top plan in FIG. 10 the article is fed into the module along a path, indicated by the arrow A, which is along the cross-web axis. The article is carried into the module by a conveyor belt 200. The module includes a right side plate 202, a left side plate 204, a rear cross plate 206, an intermediate cross plate 207, a first front plate 208 and a second front plate 210. Five roller pulleys 212, 214, 216, 218 and 220 are journaled between the two front plates 208 and 210. The conveyor belt 200 is looped around the roller 212, around the roller 214, over the roller 220, under the roller 218 and over the roller 216, as shown in FIG. 11. The roller 220 is journaled in a horizontally traversable mechanism, so that this roller may be adjusted to make the conveyer belt taut. The roller 218 has a fixed thereto shaft 222 which extends rearwardly and has a fixed thereto sprocket wheel 224. A motor, not visible, has an output shaft 226 to which is fixed a sprocket wheel 228. An endless roller-chain 230 couples the sprocket wheels 224 and 228, whereby the motor continuously drives the conveyor belt 200.

An adjustable width entryway is provided by an upstanding sidewall 232, fixed to the second front plate 210, which is bent over into a roof portion 234. A depending sidewall 236 is adjustably fixed to the roof by a guide pin 238 and a thumb nut and screw 240 disposed through a slot 242 in the roof.

A snap action switch 244 is fixed to the rear of the front plate 210 and has an actuator arm 246 extending through a hole in the plate. A leaf spring 248 is fixed to the front of the front plate 210 adjacent the arm 246. As the article passes through the entryway it deflects the arm 246 to actuate the switch 244. This switch operates a solenoid, not visible, to release a gate member 250 which is pivoted at 252 and biased by a spring 254 into an extended position. When the gate member is in its fully extended positon, it blocks the entryway, to preclude the entry of a succeeding article. If the article which deflected the switch actuator is still in the entryway when the gate member is released, the leading tip 256 of the gate member abuts the side of this article until it has passed through the entryway, at which time the gate member is free to swing out fully to block the entryway.

The article is carried by the conveyor belt 200 along the cross-web axis towards a snap action switch 258 which is fixed to a bracket 260. The bracket 260 is adjustably secured to the front face 262 of a pusher plate 264, by means of a guide pin 266 and a thumb nut and screw 268 engaging a slot in the plate. The pusher plate is fixed to a pusher frame which consists of a front cross plate 270, a rear cross plate 272, a right lateral plate 274, a left lateral plate 276, all fixed together to form a rectangle; a right lateral plate 278 which is fixed to the plate 274 by a longitudinal plate 280. A right upper rack 286 is fixed to the plate 278, and a plurality of guide rollers 288 are journaled to the plate 278. A left upper rack 290 is fixed to the plate 282, and a plurality of guide rollers 292 are journaled to the plate 282.

A right lower rack 294 is fixed by a plate 296 to the right side plate 202. A left lower rack 298 is fixed by a plate 300 to the left side plate 204. A shaft 302 has fixed thereto a right pinion 304 which is meshed with and between the upper right rack 286 and the lower right rack 294, and a left pinion 306 which is meshed with and between the upper left rack 290 and the lower left rack 298. The shaft 302 is journaled between and through two lateral plates 308 and 310, which are fixed to a longitudinal plate 312. A guide rod 314 is fixed to and between the plates 206 and 207, and passes through a journal 316 in the plate 312. A two direction, positive action, air cylinder 318 is fixed to the plate 207 and has a piston 319 which is fixed to the plate 312.

An upper right guide bar 320 and a lower right guide bar 322 are fixed to the right side plate 202 and receive therebetween the guide rollers 288. An upper lift guide bar 324 and a lower left guide bar 326 are fixed to the left side plate 204 and receive therebetween the guide rollers 292.

The snap action switch 258 has an actuator arm 328 which can be deflected by a leaf spring 330. When the article has been carried by the conveyor belt 200 to the bracket 260, it is halted by this bracket, and it deflects the spring 330 and the arm 328 to actuate the switch 258. The actuated switch 258 operates a solenoid valve, not visible, to cause the air cylinder 318 to pull in its piston 319, advancing the plate 312 and thereby the shaft 302 in the machine direction. As the shaft 302 advances, its pinions are rotated by the fixed lower racks 294 and 298, and they drive the upper racks 286 and 290 in the machine direction. The plate 270 moves, in effect, doubling the stroke of the air cylinder, as may be seen from FIG. 13.

As the pusher frame advances in the machine direction it carries the pusher plate 264 which pushes the article. The frame is advanced until the article has been pushed into the cross-web sealer module, beyond the cross-web sealer bars therein. At this extension of the pusher frame, the actuator arm, not visible, of a snap action switch 323 which is fixed to the stationary cross plate 207, is deflected by an actuator 325 which is fixed to the movable plate 312. This switch 323 activates a solenoid operated valve, not visible, to cause the air cylinder 318 to reverse its stroke, retracting the pusher frame and the pusher plate.

As seen in FIGS. 11 and 11A, as the pusher frame retracts, the actuator arms 327, of a snap action switch 329 which is fixed to the side plate 202, is deflected by an actuator 331 which is fixed to the underside of the movable plate 312. The actuator arm 327 has a toggle link 332 at its distal end, and the actuator 331 has a ramp shaped projection 334, so that the actuator arm is deflected only on the return movement of the plate 312, and not on its prior advance movement. The switch 329, when actuated, signals the withdrawal of the pusher plate plate rearwardly of the cross-bar sealer assembly, to permit the commencement of the cross-web sealing operation prior to the complete return of the pusher frame.

When the pusher frame has fully returned, an actuator 336 carried by the plate 312 deflects the actuator arm not visible of a snap action switch 340. The switch 340, when actuated signals the complete return of the pusher frame, and sets up the infeed module for a new cycle of operation. An air cylinder 342 has a piston 344 which is coupled to the gate member 250 by a fixed pin 346 which projects into a cavity in the underside of the member. The switch 340 actuates a solenoid valve, not shown to actuate the air cylinder 342 to retract its piston 344 to withdraw the gate member 250 against the bias of the spring 254 from the entryway. The next succeeding article can now be carried by the conveyor belt 200 into the infeed module.

Figure 15:
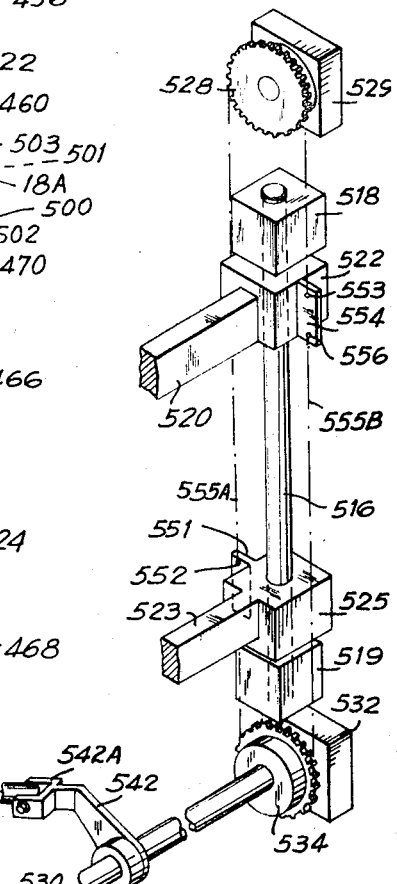
FIG. 15 is a perspective view of a detail of FIG. 14, showing the principle of the sealer bar support structure.
Figure 16:
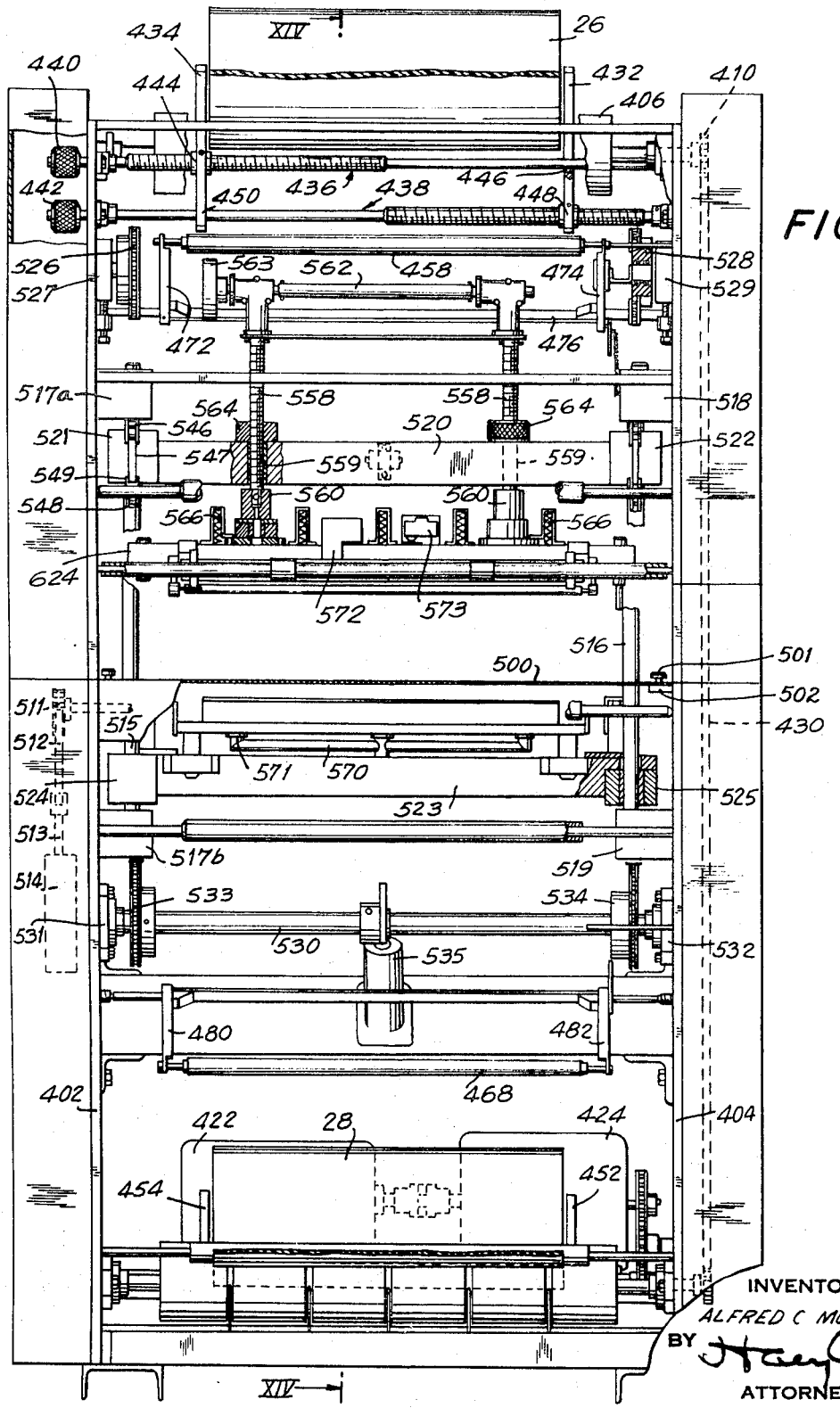
FIG. 16 is an end view in elevation of the module of FIG. 14.

The cross-web axis sealer module of FIGS. 14 through 16

The cross-web axis sealer module 14 to initially actuate switch 244 and subsequently switch 258, as previously described includes a left side plate 402 and a right side plate 404. The upper web supply roll 26 is vertically supported by two rubber jacketed unwind rollers 406 and 408, which are journaled between the side plates 402 and 404, and have respective shafts extending beyond the plate 404, each with a sprocket wheel, 410 and 412 respectively, fixed thereto. The lower web supply roll 28 is similarly vertically supported by two rubber jacketed unwind rollers 414 and 416, which are journaled between the side plaes 402 and 404, and have respective shafts extending beyond the plate 404, each with a sprocket wheel, 418 and 420 respectively, fixed thereto. A motor 422 is coupled to an electrical clutch and brake 424 which has an output shaft with a sprocket wheel 426 fixed thereto. An endless sprocket chain 428 couples the sprocket wheel 426 to a sprocket wheel, not visible, to which the roller 416 is fixed. An endless sprocket chain 430 intercouples the sprocket wheels 410, 412, 418 and 420, whereby the motor 422 is adapted to drive the unwind rollers 406, 408, 414 and 416.

The upper supply roll 26 is also horizontally contrained by two brackets 432 and 434. The brackets are supported by two shafts 436 and 438 which are journaled between the side plates 402 and 404 and which terminate beyond the plate 402 in manually rotatable knobs 440 and 442 respectively. The shaft 436 has a left portion of large diameter which is externally threaded and which passes through a mating internally threaded bore 444 in the bracket 434. The shaft 436 also has a right portion of small diameter which is smooth and which passes through a mating bore 446 in the bracket 432. The shaft 438 has a similar right portion of large diameter which is externally threaded and which passes through a mating internally threaded bore 448 in the bracket 432, and a left portion of small diameter which is smooth and which passes through a mating bore 450 in the bracket 434. Rotation of the knob 440 is thus adapted to horizontally traverse the bracket 434, while rotation of the knob 442 is adapted to horizontally traverse the bracket 432, whereby the upper supply roll 26 may be horizontally positioned. The lower supply roll 28 is similarly horizontally contrained by two brackets 452 and 454, which are carried by and horizontally traversable by two shafts 456 and 458 which are journaled between the side plates. The manually rotatable knobs for these two shafts are not shown.

The upper web 22 unwinds over the unwind roller 406, under a roller 456 which is journaled between the side plates 402 and 404, over a dancer roller 458, under a roller 460 which is journaled between the side plates, to a seal or junction 464 with the lower web 24. The lower web 24 unwinds over the unwind roller 414, under a roller 465 which is journaled between the side plates, over a roller 466 which is journaled between the side plates, under a dancer roller 468 and over a roller 470 to the seal 464.

The upper dancer roller 458 is journaled between two side arms 472 and 474, which are joined together by a cross bar 476, and which are journaled on a shaft 478 which extends from and between the side plates 402 and 404. The lower dancer roller 468 is journaled between two side arms 480 and 482, which are joined together by a cross bar 484, and which are journaled on a shaft 486 which extends from and between the side plates. A link 488 is pivotally coupled at 490 to the arm 474 and is pivotally coupled at 492 to the arm 482. Similarly a link, not visible, is pivotally coupled between the arm 472 and 480. The arms 472, 474, 480 and 482 are of equal length. The spacing between the shaft 478 and the pivot 490 is equal to spacing between the shaft 486 and the pivot 492, and the spacing between the central axis of the roller 458 and the pivot 490 is equal to the spacing between the central axis of the roller 468 and the shaft 486, to constrain the rollers 458 and 468 to symmetrical movement. A tension spring 494 is connected between the end of the link 488 and the side plate 404 to bias the dancer rollers towards their respective supply rolls, to maintain tension on the webs 22 and 24.

An upper stripper bar 496 is fixed from and between the side plates and has a plurality of fingers 497 whose distal ends tangentially engage the periphery of the unwind roller 406 under the off-winding web 22. These fingers preclude the web 22, which becomes electrostatically charged, from clinging to the unwind roller 406 and winding therearound. A lower stripper bar 498 having a plurality of fingers 499 similarly precludes the clinging of the web 24 to the unwind roller 414.

An entrance platform is provided by a plate 500 which is adjustably mounted with respect to the machine axis by two thumb nuts and screws 501 to a cross-bar 502 which is fixed to and between the side plates 402 and 404. The downstream edge of the plate is formed with a bead or roll 503 which deflects the web 24. A conveyor assembly 504 is spaced downstream from the roll 503 to provide a gap through which the lower cross-web sealer assembly 32 may be vertically traversed. The conveyor assembly includes a cross-plate 505 fixed to and between the side plates, four rollers 506, 507, 508 and 509 which are journaled to and between these side plates 402 and 404. An endless belt 510 passes around the roller 506, over the plate 505, around the roller 507, under the roller 508, and over the roller 506. The roller 508 is mounted in vertically adjustable journals, and is adapted to apply tension to the belt 510. The roller 506 has a pinion 511 fixed thereto, by means of a one-way clutch, not visible, and meshes with a rack 512 formed on a piston 513 of an air cylinder 514 fixed to the outside of the side plate 402. When the air cylinder is actuated, the rack drives the pinion and the belt, when the piston is retracted by a tension spring, not shown, the pinion is decoupled by the clutch.

The cross-web sealer assemblies 30 and 32 travel on two vertical guide rods 515 and 516. The rod 515 is fixed to the side plate 402 by an upper support block 517a and a lower support block 517b. The rod 516 is fixed to the side plate 404 by an upper support plate 518 and a lower support plate 519. An upper cross-bar carriage 520 is mounted for vertical movement on the guide bars by a bushing 521 which rides on the guide rod 515 and a bushing 522 which rides on the guide rod 516. A lower cross-bar carriage 523 similarly has a bushing 524 which rides on the guide 515 and a bushing 525 which rides on the guide rod 516. An upper left sprocket wheel 526 is journaled to the side plate 402 by a bearing 527, and an upper right sprocket wheel 528 is journaled to the side plate 404 by a bearing 529. A cross-shaft 530 is journaled between a left bearing 531 fixed to the left side plate 402 and a right bearing 532 fixed to the right side plate 404, and has fixed thereto a lower left sprocket wheel 533 and a lower right sprocket wheel 534.

An air cylinder 535 is pivotally mounted at 536 to a bracket 537 which is fixed to a cross-bar 538 which is fixed between the side plates. The cylinder has a piston 539 which is pivotally coupled at 541 to a bifurcated end 542A of a crank arm 542 which is fixed to the shaft 530. A sprocket chain is pinned to an extension of the lower left bushing 524, passes over and meshes with the sprocket wheel 526, and is pinned at 546 to an extension 547 of the upper left bushing 521. A sprocket chain 548 is pinned at 549 to the extension 547, passes under and meshes with the lower left sprocket wheel 533 and is pinned to the extension of the bushing 524. Similarly a sprocket chain 555A is pinned at 551 to an extension 552 of the lower right bushing 525, passes over and meshes with the upper right sprocket wheel 528, and is pinned at 553 to an extension 554 of the upper right bushing 522. A sprocket chain 555B is pinned at 556 to the extension 554, passes under and meshes with the lower sprocket wheel 534 and is pinned to the extension 552. Thus, when the air cylinder piston 539 is extended, the crank arm is rotated clockwise, as seen in FIG. 14, which rotates all four sprocket wheels clockwise, and by means of the four sprocket chains, traverses the upper and the lower cross-bar carriage along the guide rods towards each other. When the piston is retracted, the sprocket wheels are rotated counter-clockwise, traversing the carriages away from each other.

The upper cross-bar sealer 540 depends from the upper carriage 520 by two externally threaded shafts 558 which pass through and engage two internally threaded bores 559 respectively in the carriage 520. The lower ends of these shafts are captured in and are rotatable within respective extensions 560 of the sealer. The upper ends of these shafts are coupled to a miter gear box assembly 562 which has a hand wheel 563. Rotation of the hand wheel causes rotation of these shafts which causes a change in the spacing between the carriage and the sealer. Two lock nuts 564 are respectively mounted on these shafts to lock these shafts against rotation after they have been adjusted.

The upper cross-bar sealer 540 has two spaced apart clamping bars 565 depending therefrom by a plurality of vertical rods, and biased downwardly by a plurality of compression springs 566. An electric radiant heating element 567 is tautly supported between the clamping bars as shown in U.S. Patent No. 3,330,716, issued July 11, 1967 to Seymour Zelnick. The lower cross-bar sealer 568 upstands from the lower carriage 523 and has a central groove which provides two spaced apart clamping bars 569. An air duct 570 is also carried by the lower carriage 523 and has a plurality of parts 571 coupled through to the central groove for cooling the lower cross-bar sealer. The duct is supplied with air under pressure by flexible conduits from a source which are not shown. Two safety snap action switches 572 and 573 are carried by the upper cross-bar sealer 540. The switch 572 is rigidly mounted and when actuated will halt the movement of the sealers towards each other. The switch 573 is spring mounted and when actuated, will start the heat cycle for the radiant heater 567.

A snap action switch 574 is mounted by a bracket to the side plate 404, and has an actuator arm 575 which is normally engaged by the arm 474 supporting the dancer roller 458. This switch is in circuit with the supply clutch and brake 424. When the actuator arm 575 is engaged, the brake function is energized, when the actuator arm is released, the clutch function is energized.

The spacing between the upper and the lower sealing bars is adjusted by the gear box hand wheel 563 so that the plane of contact between the upper and lower bars will bisect the height of the article being packaged.

In operation, the pusher plate 264 of FIG. 10 advances the article 18A onto the entrance platform and against the junction 464 of the upper and lower webs as shown in FIG. 14. The advance of the article pulls the webs along, moving the dancer rollers 458 and 468, energizing the supply clutch 424 by the switch 574 to drive the supply rolls 26 and 28 to unwind or feed the webs. When the article reaches the position shown as 18B, the switch 323 is actuated and the pusher plate is retracted, the dancer rollers return to their original position, halting the further unwinding of the supply rolls.

When the pusher plate has retracted adequately to clear the sealer bar mechanism, the arm 328 is actuated to actuate the switch 258, to actuate a valve on an air line, both not shown, to actuate the air cylinder 535 to bring the upper and lower cross-bars together. The upper and lower cross-bars initially clamp the upper and lower webs 22 and 24 together behind the article shown at 18B, and then the switch 573 is energized to melt a gap into the clamped together portions of the webs, and to seal together, by means of the melted-back bead, the edges of the webs bounding the gap. Reference may be had to U.S. Patent Application S.N. 329,499, filed Dec. 10, 1963, by Seymour Zelnick, assigned to a common assignee, for further details.

After the heating cycle is over, determined by a suitable time delay mechanism, the air cylinder 535 is to permit an internal spring, not shown, to return the upper and lower cross-bar sealers apart. The air cylinder 535 may be a positive drive, two direction stroke, if desired.

The air cylinder 514 is also pulsed, to reciprocate its rack 512 and via the associated gear and one way clutch to drive the conveyor belt 510 for an increment adequate to advance the article to the position shown as 18C, whereat it is received by the continuous sealer module 16.

A continuous sealer module of FIGS. 17 through 25

The continuous sealer module 16 includes a fixed right support plate 600 and a similar fixed left support plate 602. A shaft 604 is journaled through these plates by two bearings 606 and 608. Two miter gears 610 and 612 are respectively fixed to the shaft 604 exteriorally of these fixed side plates 600 and 602. An upper pillow block 613 and a lower pillow block 615 are fixed to the exterior of the right support plate 600. A vertically disposed, elevating shaft 614 is journaled at its upper end in the pillow block 613 and is journaled at its lower end through the pollow block 615. A miter gear 616 is fixed to the lower end of shaft 614 and meshes with the miter gear 610. The mediate portion 619 of the shaft 614 is threaded. A vertical slot 617 is formed through the fixed right support plate 600. An elevating carriage 618 comprises a horizontal element 620 having distal two vertical stubs 622 and 624, a medial vertical stub 626, two reinforcing gussets 628 and 630, and a vertical elevation nut-portion 632 fixed to the medial stub 626. The horizontal element and the stubs 622, 624 and 626 are disposed against the inner face of the side plate 600. The nut 632 extends through the slot 617 and has a vertical, threaded bore which receives and meshes with the shaft 614. A similar mirror-symmetrical arrangement, not shown, of a vertical shaft, a slot and an elevating carriage is provided for the fixed left support plate. A hand wheel 634 is fixed to the horizontal shaft 604. Rotation of the hand wheel 634 provides parallel traversal of the two elevating carriages 618. A cross rod 636 is fixed to and between the respective vertical distal stubs 622 of the elevating carriages, and a cross rod 638 is fixed to and between the respective vertical distal stubs 624. A right side plate 640 for supporting the continuous sealer assemblies 38 has two apertures 642 which have bushings 646 respectively fixed therein, which receive and slide on the cross rods 636 and 638 respectively.

A mirror-symmetrical left side plate, not shown, is similarly provided adjacent the left fixed side plate and is also slideable on the cross rods 636 and 638.

Two cross traverse shafts 650 and 652 are respectively journaled in bearings 654 (one not visible) through and between the fixed side plates 600 and 602. The right hand medial portions of the cross traverse shafts 650 and 652 are right hand threaded, while the left hand medial portions are left hand threaded. The right hand slideable side plate 640 has two vertical slots 658 and 660, in which are respectively captured two exteriorly slotted traversing nuts 662 and 664. The traversing nuts 662 and 664 each have a right hand threaded bore which respectively receive and mesh with the right hand threaded portions of the cross-traverse shafts 650 and 652. A hand wheel 668 is fixed to the cross-traverse shaft 650. A sprocket wheel 670 is fixed to the shaft 650, and a sprocket wheel 672 is fixed to the shaft 652. Four idler sprocket wheels 674, 676, 678 and 680 are mounted to the exterior of the fixed side plate 600. An endless sprocket chain 682 passes around the sprocket wheel 670, over the sprocket wheels 674 and 678, around the sprocket wheel 672, over the sprocket wheels 680 and 676, and back to wheel 670. A mirror-symmetrical arrangement, not shown, is provided for the slideable left side plate an equivalent arrangement of sprocket wheels and chains is provided exteriorly to the fixed left side plate 602. Rotation of the hand wheel 668 thus directly rotates the shaft 650, and by means of the sprockets and chains rotates the shaft 652. Clockwise rotation of the shafts traverses the right side traversing nuts 662 and 664 with the slideable right side plate 640 and the left side traversing nuts with the slideable left side plate towards each other. Counter-clockwise rotation traverses the side plate away from each other. By this arrangement, articles of different widths can be exactly accommodated between the continuous sealer assemblies 38 and 40.

The article conveyor assembly 36 is also supported by the cross-traverse shafts 650 and 652. A right hand threaded block 684 and a left hand threaded block not shown, are mounted on the shaft 650, between the right and left slideable plate. A right hand threaded block 686 and a left hand threaded block, not shown, are mounted on the shaft 652, between the right and left slideable plates. Two plates 688 and 690 are fixed respectively to and between the right blocks 684 and 686. Two similar plates, not shown, are fixed respectively to and between the left blocks. A platform member 692 is fixed transversely to and between the right set of plates 688 and 690, and extends longitudinally at each end therebeyond. A similar platform member, not shown, is fixed to the left set of plates. Two pulleys 694 and 696 are respectively journaled to and between the side plates 688 and 690. A wide vertical slot 698 is cut into the plate 690, and a narrow vertical slot 700 is cut into the plate 688. A pulley 702 is adjustably mounted to the plate 688 through the narrow slot 700. A shaft 704 is journaled to and between the fixed side plate 600 and 602. A shaft 706, and three idler rollers 708, are journaled to and between extension brackets 710, respectively fixed to the fixed side plates 600 and 602. The shafts 704 and 706 have respective keyways 712 and 714 provided along their lengths. A right pulley 716 is disposed on the shaft 704 and is slideably keyed to keyway 712. A right pulley 718 is disposed on the shaft 706 and is slideably keyed to the keyway 714. An endless conveyor belt 720 passes around the pulley 716, between the plates 688 and 690, over the pulley 696, under the pulley 702, over the pulley 694, around the pulley 718, over the platform member 692 and back to the pulley 716. A similar arrangement of left pulleys and endless conveyor belt is provided for the left set of side plates. Rotation of the hand wheel 668, thus also traverses the right and left conveyor belts 720, to accommodate articles of different widths. Two sprocket wheels 722 and 724 are fixed to the shaft 704. A motor 726 has an output shaft with a sprocket wheel 728 fixed thereto, which is coupled by an endless chain 730 to the sprocket wheel 722. Thus the motor 726 drives the two belts 720 irrespective of their transverse location by the hand wheel 668.

The right side plate 640 has six apertures therein respectively receiving fixed therein six bearings 732, 734, 736, 738, 740 and 742. Similar bearings are fixed symmetrically in the left side plate. A shaft 744 is journaled between the bearings 732 and extends beyond the bearing 732. A sprocket wheel 736 is fixed to the right end of the shaft 744. The remainder of the shaft has a keyway 746. A spur gear 748, a pulley 750, and two sprocket wheels 752 and 754 are fixed to a common hub 756, which hub is keyed to the keyway 746 and slideable along the shaft 744. A shaft 760 passes through the bearing 734 and has fixed thereto at one end a spur gear 762 which meshes with the spur gear 748. A pulley 764 and two sprocket wheels 766 and 768 are fixed to the other end of the shaft 760. An endless sprocket chain 770 passes around the sprocket wheel 736 and the sprocket wheel 724, whereby the motor 726 drives the shaft 744 in synchronism with the shaft 704.

Two sprocket wheels 772 and 774 are journaled in the bearing 742; two sprocket wheels 776 and 778, are journaled in the bearing 740; two sprocket wheels 780 and 782 are journaled in the bearing 738; and two sprocket wheels 784 and 786 are journaled in the bearing 736. An endless sprocket chain 790 passes around the sprocket wheels 752, 772 and 776. An endless sprocket chain 792 passes around the sprocket wheels 754, 774 and 778. An endless sprocket chain 794 passes around the sprocket wheels 766, 780 and 784. An endless sprocket chain 796 passes around the sprocket wheels 768, 782 and 786. A plurality of cap blocks 84 are snapped onto each of the web conveyor sprocket chains 790, 792, 794 and 796.

A pulley 798 is also journaled to the plate 640. An endless belt 800 passes around the pulley 764 and 798 an against the pulley 750.

A mirror-symmetrical arrangement of gears; pulleys, and belt; sprocket wheels and cap 84 blocked sprocket chains 790, 792 794, 796 are provided on the left plate all not shown.

By this arrangement the spacing between the right side plate 640 and its associated sprocket chains and belt and the left side plate and its associated sprocket chains and belt may be varied by the hand wheel 668 driving the right and left hand threaded shafts 650 and 652. Irrespective of the spacing of the side plates, the motor 726 will synchronously drive the cap blocked sprocket chains 790, 792, 794, 796, the belts 800, and the article conveyor belts 720.

The sprocket chains are phased and spaced so that each cap block 84 on the lower run of an upper sprocket chain, e.g., 794 is directly opposite and so closely spaced to a respective cap block on the upper run of a lower sprocket chain 790 as to clamp the two webs of 22 and 24 therebetween.

Two radiant heating elements 804, are supported above the plane of the webs by two respective bracket assemblies 808, 810. Two radiant heating elements 812, are supported below the plane of the webs by two respective assemblies 816, 818.

The bracket assembly 808 includes a longitudinally extending back plate 820, a laterally extending stub plate 821 at one end, a laterally extending stub plate 824 at the other end, and a plurality of intermediate laterally extending stub plates 826. Fixed to the end plate 824 is an insulator block 825 having a toe portion 828 extending downwardly below the bottoms of the plates. One end of the heating element 812 is fixed to this toe portion. Two rods 830 and 832 are fixed between the plate 821 and the next adjacent intermediate plate 826. An insulator block 834 has two suitable longitudinal bores therein which respectively receive these rods, and a toe portion which extends below the bottom of the plates. The other end of the heating element 812 is fixed to this toe portion. Two compression springs 838 are respectively captured on the rods between the block 834 and the plate 826 and bias the block to maintain the heating element taut between the two insulator blocks. The ends of the heating element are coupled to a suitable power source by flexible insulated conductors, not shown.

Two slots 840 are cut into the lower portion of each of the laterally extending plates, 821, 824, 826. A laterally extending, vertically elongated hole 842 is bored through each plate intersecting the two slots therein. Two longitudinally extending rods 844 are respectively disposed in each of the slots in each plate. Each rod is captured in such slot by a roll or cross pin 846 passing through a suitable diametrical bore and extending into the adjacent vertically elongated hole 842. Each rod is biased downwardly by respective compression springs captured in each slot above the rod. The springs may be captured by forming the slots 840 with a circular cross-section to receive the springs, the diameter of the rods being smaller than the diameter of the springs. By this arrangement the lower surfaces of the rods 844 resiliently extend downwardly below the bottoms of the plates. These lower surfaces engage the upper surfaces of the lower run of the cap blocked sprocket chains 794, 796. The bracket assembly 810 is a mirror-symmetrical duplicate of the assembly 808. The bracket assembly 816 is a mirror-symmetrical duplicate of the assembly 808 with one exception. The rods equivalent to the rods 844 are fixed to the lateral plates, so that their upper surfaces fixedly project above the tops of the plates. The bracket assembly 818 is a mirror-symmetrical duplicate of the assembly 816. The upper surfaces of these rods engage the lower surfaces of the upper run of the cap blocked sprocket chains 790, 792. These resiliently downwardly biased upper rods and fixed lower rods serve to constrain the cap blocked sprocket chains to clamp the webs 22 and 24 therebetween and to remain in fixed contact with the webs as they pass between the radiant heating elements.

A mirror-symmetrical arrangement of bracket assemblies is fixed to the left plate.

In use the hand wheel 634 is rotated to vertically adjust the plane of contact between the upper and lower cap blocked sprocket chains so that this plane bisects the height of the articles being wrapped. It will be noted that the height of the upper runs of the article conveyor bands 720 is not variable. The hand wheel 668 is rotated to adjust the lateral spacing between the right and the left cap blocked sprocket chains to accommodate the width of the article therebetween. It will be noted that the lateral spacing between the right and the left conveyor bands is concurrently thereby varied.

The article is delivered from the cross-web sealing module with the upper and lower webs 22 and 24 joined adjacent the leading edge and the trailing edge of the article, by the conveyor 510 and passes onto the conveyor bands 720. The right margins of the webs 22, 24 pass into the nip between the right-upper set of cap blocked sprocket chains 794, 796 and the right-lower set of cap blocked sprocket chains 790, 792, are clamped therebetween and carried along by the chains. The left margins of the webs 22, 24, pass correspondingly into the nip between the left sprocket chains. The weight of the article is carried by the conveyor bands 720, which move at the same speed as these sprocket chains, thus there is no tendency for the weight of the article to laterally pull the right and left margins of the webs from the sprocket chains.

In commercial operations, the webs may be wrinkled, and thus not in intimate contact although clamped between the upper and lower cap blocked sprocket chains. In view of this, the leading radiant heating elements 804, 812, are operated at a temperature which will shrink the portion of the webs clamped between the chains and passing therebetween into intimate contact with each other, but which temperature will not sever the webs. The following radiant heating elements, 806, 814 are operated at a temperature which will melt a gap into the portions of the webs clamped between the chains and will join the edges of the webs bounding this gap, as taught in U.S. Patent No. 3,243,330, supra. This two zone heating arrangement is the invention of Seymour Zelnick, and is claimed in U.S. Patent No. 3,355,337, issued November 28, 1967.

The several outermost marginal portions or trim of the webs are carried along by the outermost vertical pairs of sprocket chains 794, 790. In prior commercial operations, this severed trim, due to static electric charges, when released by the chains, might be attracted to the packaged article. Since the trim is still tacky along its severed edges, it might permanently adhere to the packaged article. To avoid this, the pulley and belt systems including the belts 800 have been provided. The right severed trim is carried by the chains into the nip between the pulley 750 and the belt 800, and is carried therebetween away from the wrapped article, to be released above a hopper 850, which may advantageously have a vacuum applied thereto.

As shown in FIG. 19, the cross-shaft 652 may be journaled through a rubber bushing 852 in the plates 640 to accommodate for minor misalignment.

The manually loaded and intermittently advanced embodiment of FIG. 26

The principles of this invention have also been embodied in a semi-automatic packaging machine. This machine comprises an in-feed module 900, a cross-web sealing module 902, and a continuous web sealing module 904. The in-feed module 900 includes a supply roll of a longitudinally folded web 906 which is supported on a suitable central shaft, to provide two webs 908, 910, which are joined together along their right (rear) edges at the fold line 912. The article 914 is manually inserted between the left edges of the upper web 910 and the lower web 908, and is longitudinally shifted in the machine direction against the leading edge junction 916, formed in the wrapping of next preceding article. The article is further manually advanced longitudinally, pulling the webs along, between an upper sealer bar 918 and a lower sealer bar 920 of a cross sealer 922, until the trailing edge of the article is beyond the cross-bar sealer. The article now lies on an intermittently operated, presently stationary, conveyor belt 924. The operator actuates the cross-bar sealer 922 by means of a manual push-button or foot switch, which actuates suitable solenoid valves to operate a suitable air cylinder to cause the upper sealer bar 918 to descend against the webs and the lower, stationary, sealer bar 920. After a pre-timed sealing interval, during which a gap is melted into the webs and the webs are joined along their edges bounding the gap, the solenoid valves are actuated to operate the air cylinder to raise the upper sealer bar 918, and to advance the conveyor belt 924. The conveyor 924 carries the article, which now has junctions along its leading and trailing edges, onto a continuously operated conveyor belt 926 of the continuous sealer module 904. A continuous sealer 928, similar to that shown in FIG. 17, is disposed along the left (front) edge of the module. The sealer has the previously described four cap blocked sprockets chains, each respectively mounted on three sprockets wheels to a panel 930. If desired, the panel may be vertically adjustable, to accommodate the sealer to articles having different heights. The sealer also has the previously described pulley and belt system for scrap removal. A transversely adjustable fence or guide 932 may be provided to guide the article being wrapped to the left (front) so that the left marginal portions of the webs 908 and 910 will be seized by the cap blocked sprocket chains and carried between the radiant heaters for melting and sealing. The left-most marginal scrap portions are positively separated from the wrapped article by the pulley and belt system and are discharged through the outlet 934.

The automatically loaded and continuously advanced embodiment of FIG. 27

The principles of this invention have also been embodied in a fully automatic, continuous motion packaging machine. This machine comprises a continuously operated in-feed portion 950, a continuously operated cross-web axis sealer portion 952, and a continuously operated machine direction sealer portion 954. An upper supply roll 956 is supported on two transversely journaled unwind rollers 958 to continuously supply an upper web 960. A lower supply roll 962 is supported on two transversely journaled unwind rollers 964 to continuously supply a lower web 966. The upper and lower webs have a mutual junction, not visible.

The in-feed portion 950 includes a platform 968 having an article receiving area 970, which may be supplied with successive articles by a chute, not shown. A mirror symmetrical right and a left article conveyor mechanism 972 are provided to transport each successively received article from the receiving area 970, to and into the in-feed portion 950. Each article conveyor mechanism includes a forward sprocket wheel 974 and a rearward sprocket wheel 976, both journaled for rotation about a vertical axis, and driven by suitable means, not shown. An endless sprocket chain 978 passes around both sprocket wheels. A plurality of the outer-link pairs 980 of the chain are formed of a single element of U shaped cross-section to provide the two outer-links and a connecting web 982. These U shaped outer-link pairs 980 are uniformly longitudinally, and symmetrically transversely, spaced apart in each of the two sprocket chains at a longitudinal spacing greater than the length of the article to be wrapped. A horizontal flight or rod holder 984 is mounted above and carried by the respective link pair 980 by a vertical connecting plate 986 fixed to both the holder 984 and the web 982. A flight or rod 988 is slidably disposed in the respective holder 984. Each holder 984 is provided with a slot therein through which pass a horizontal pin 990 and a vertical pin 992, both pins being fixed to the flight. One end of a tension spring 994 is fixed to the horizontal pin 990 and the other end thereof is fixed to a horizontal pin 996 which is fixed to the holder 984, thereby normally biasing the flight 988 into a retracted position in the holder, as shown in FIG. 28. A cam follower 1000 is fixed to the pin 992, and when cammed, is effective to move the flight towards an extended position, as shown in FIG. 29. A plate 1002 is disposed above the inner runs of each of the sprocket chains 978, and has a cam plate 1004 vertically depending therefrom. As each flight passes around the sprocket wheel 974 into the inner run of the chain, the rising portion 1006 of the cam plate engages the cam 1000, moving the flight 988 to its extended position against the bias of the spring 994, whereat the flight sweeps over a portion of the receiving area 970. The symmetrical flight on the other chain is cammed in synchronism therewith. Thus these two flights are extended behind the trailing edge of the article disposed at the receiving position 970 on the platform 968 and carry this article forward in the machine direction.

The continuous cross-web axis sealer portion 952 includes two, vertical, parallel mirror symmetrical side plates 1008. Four upper sprocket wheels 1010 are spaced from and journaled to the inner face of each side plate, and an upper, continuous sprocket chain 1012 passes around these sprocket wheels, in a substantially rectangular configuration. Four lower sprocket wheels 1014 are spaced from and journaled to the inner face of each side plate, and a lower, continuous sprocket chain 1016 passes around these sprocket wheels, in a substantially rectangular configuration. A plurality of upper cross-web sealer bars 1018 are coupled to and between the upper right and left sprocket chains 1012, and a plurality of lower cross-web sealer bars 1020 are coupled to and between the lower right and left sprocket chains 1016. Each sealer bar is coupled to the respective sprocket chain by a block 1022 which is pinned at 1024 to a link-pair of the chain. The block has a vertical bore 1026 therethrough to receive a slidable rod 1028, having an enlarged head 1030 at its outer end. A compression spring 1032 is captured on the rod 1028 between the head and the block. Two rollers 1034 are horizontally journaled to a vertical plate 1036 which is fixed to the outer side of the block 1022. Two vertically spaced apart guide plates 1038 extend horizontally from the inner face of the respective side plate, between the side plate and the sprocket wheels. The guide plates are disposed adjacent the inner runs of the respective upper and lower sprocket chains 1012 and 1016. As the block passes around a sprocket wheel into the inner run, the roller 1034 carried thereby enters between the two guide plates 1038, as shown in FIG. 30. The blocks 1022 which are pinned to the lower chains 1016 also have a pair of arms 1040 attached thereto. An article conveyor band 1042 is pinned at 1044 to and between the trailing arm of the next preceding block and the leading arm of the succeeding block.

The right end of each upper cross-web sealer bar 1018 is fixed to the inner end of the rod 1028 carried by a respective block 1022 pinned to the upper right sprocket chain 1012. The left end is fixed to the inner end of the rod 1028 carried by the respective block 1022 pinned to the upper left sprocket chain 1012. Similarly, the right end of each lower cross-web sealer bar 1020 is fixed to the inner end of the rod 1028 carried by a respective block 1022 pinned to the lower right sprocket chain 1016, and the left end is fixed to the inner end of the rod 1028 carried by the respective block 1022 pinned to the lower left sprocket chain 1016. The cross-web sealer bars are disposed on the sprocket chains at interval spacings equal to that of the flights 988, and the chains 1012 and 1016 advance at the same speed as the chains 978.

Each upper bar 1018 has at each end thereof a cam follower 1046 journaled thereto. Each lower bar 1020 has at each end thereof a cam follower 1048 journaled thereto.

A pair of vertical plates 1050 are vertically, slidably mounted to the respective side plates 1008 by means of a plurality of brackets 1052. Each bracket includes a vertical shaft 1054 which is journaled between two pillow blocks 1056 which are fixed to the respective side plates 1008. A nut 1058 is fixed to the plate 1050 and rides on the shaft 1054 whose mediate portion is threaded. Each plate has an upper cam plate 1060 and a lower cam plate 1062 extending horizontally therefrom. As the cross-web bars are carried around the sprocket wheels into the inner run of the sprocket chains 1012 and 1016, the right and left upper cam followers 1046 engage the rising portions 1062 of the right and left cam plates 1060 respectively, and the right and left lower cam followers 1048 engage the rising portions 1066 of the right and left cam plates 1062 respectively. As the cross-web sealer bars 1018 and 1020 advance in the machine direction along the inner runs, they are brought together by the cam plates acting on the cam followers against the bias of the compression springs 1032.

The upper cross-web sealer bar 1018 has suitable spring loaded clamping surfaces 1968 and a fixed radiant heating element 1070. The lower cross-web sealer bar 1020 has two fixed clamping surfaces 1072. Other known clamp, heat and seal arrangements may be utilized. The upper and lower bars are synchronized with the flights 988 so that they clamp and seal the upper and lower webs 960 and 966 to the rear of the flights which are pushing against the trailing edge of the article 1074. After the cross-web clamping bars have clamped the web, the flights 988 thereadjacent are extracted from between the clamped together bars and the trailing edge of the article by the cam plates 1004 which have a descending portion which permits the spring 994 to retract the respective flight into its holder 984. Meanwhile, the succeeding article is being advanced by the clamped together cross-web sealer bars which have the leading edge of the webs around that article clamped therebetween and which continue to advance along the inner run of the chains, and which article is supported by the conveyor bands 1042.

The plane of contact of the upper and lower cross-web sealer bars may be adjusted vertically to bisect the height of the article being wrapped by shifting the plates 1050 up or down.

The plurality of pairs of cross-web sealer bars are spaced apart so that one pair is always clamping the leading edges of the webs attached ultimately to the supply rolls.

The continuous sealer portion 954 includes two, vertical, parallel, mirror symmetrical side plates 1075. An upper and a lower continuous sealer assembly, including two upper cap-blocked sprocket chains 1076, two lower cap-blocked sprocket chains 1078, upper and lower, two section radiant heaters 1088, and scrap removal pulleys and belt, are journaled or fixed respectively to each plate 1075; and two article conveyor belts 1090 are provided, substantially as shown in FIG. 27. The two plates 1075 may be moved transversely towards or away from each other to accommodate articles of different widths, and vertically to accommodate articles of different heights, all as previously described with respect to FIG. 17.

The trailing end of the article conveyor belts 1090 overlaps the leading end of the inner runs of the cross-web sealer sprocket chains 1012 and 1016. When the clamped together cross-web sealer bars 1018 and 1020 have pulled the trailing article onto the conveyor bands, the cam plates 1060 and 1062 terminate, permitting the springs 1032 to separate the bars and to release the article. The bars subsequently leave the inner run and pass upwardly towards the return outer run, while the conveyor bands carry the sleeve wrapped article into the continuous sealer. The marginal side portions of the webs enter into the nips of the cap-blocked sprocket chains and are carried between the radiant heating elements. The marginal portions are preheated, severed and joined, and the scrap is removed, all as previously described with respect to FIG. 17.

The wrapped article, subsequent to having been sealed along its leading and trailing edges, and side edges, by the machine of any of the disclosed embodiments, may then be carried through a shrink tunnel to shrink the wrapper about the article.

While there has been shown and described the preferred embodiments of the invention, it will be understood that the invention may be embodied otherwise than as herein specifically illustrated or described and that certain changes in the form and arrangement of parts and in the specific manner of practicing the invention may be without departing from the underlying principles of this invention within the scope of the appended claims.

I claim:

1. A packaging machine for joining together two superposed webs of thermoplastic film, comprising: an upper right and an upper left endless conveyor belt disposed in side by side, spaced apart relationship; a lower right and a lower left endless conveyor belt disposed in side by side, spaced apart relationship; means for positively driving each of said belts in synchronism without relative slippage; means provided on each of said belts respectively for being driven by said driving means; a plurality of clamping surfaces provided on the outer surfaces of each of said belts respectively; the lower run of said upper right belt being in vertical alignment with the upper run of said lower right belt, and the lower run of said upper left belt being in vertical alignment with the upper run of said lower left belt, said clamping surfaces of said belts having a common plane of abutment; an upper radiant heating means disposed between said upper right and upper left belts above said plane of abutment; a lower radiant heating means disposed between said lower right and lower left belts below said plane of abutment.

2. A packaging machine for joining together two superposed webs of thermoplastic film, comprising: an upper right and upper left endless multi-link sprocket chain disposed in side by side, spaced apart relationship; a lower right and a lower left endless multi-link sprocket chain disposed in side by side, spaced apart relationship; four sprocket wheels, positively and synchronously driven in unison, each meshed with a respective chain, for positively driving said chains synchronously without relative slippage; a plurality of cap blocks clipped onto each link of said chains, each block having an outer planar surface to provide a plurality of closely adjacent clamping surfaces on the outer surface of each of said chains, the lower run of said upper right chain being in vertical alignment with the upper run of said lower right chain, and the lower run of said upper left chain being in vertical alignment with the upper run of said lower left chain, said clamping surfaces of said cap blocks on said chains having a common plane of abutment.

3. A packaging machine for joining together two superposed webs of thermoplastic film, comprising: an upper right and an upper left endless timing belt disposed in side by side, spaced apart relationship; a lower right and a lower left endless timing belt disposed in side by side, spaced apart relationship; four cog wheels, positively and synchronously driven in unison, each meshed with the teeth on the inner surface of a respective belt, for positively driving said belts synchronously without relative slippage; a plurality of closely spaced apart cap blocks adhered onto the outer surface of each of said belts, to provide a plurality of closely adjacent clamping surfaces on the outer surface of each of said belts; the lower run of said upper right belt being in vertical alignment with the upper run of said lower right belt, and the lower run of said upper left belt being in vertical alignment with the upper run of said lower left belt, said clamping surfaces of said cap blocks on said belts having a common plane of abutment.

4. An article of manufacture comprising: a multi-link-pair sprocket chain; a plurality of cap blocks, each snapped onto a respective link of the chain; each cap block being of substantially U shaped cross-section having a base portion which is rectangular in plan, and adapted to fit on top of a respective link-pair, two side portions, each of which is trapezoidal in elevation and integral along its longer base edge with a side edge of said base portion, and adapted to fit along the side of said respective link-pair, two stub portions, each of which is rectangular in plan and integral with the shorter top edge of said longitudinal portion, and adapted to fit under the side of said respective link-pair.

5. An article of manufacture comprising: a multi-link-pair sprocket chain; a plurality of cap blocks, each snapped onto a respective link-pair of the chain; each cap block being of substantially U shaped cross-section having a base portion which is rectangular in plan, and adapted to fit on top of a respective link-pair, a central stem portion integral with and depending from said base portion, and adapted to fit through the respective link-pair, the distal subportion of said stem portion being bifuracted and divergent, and adapted to fit under the rollers of the link-pair.

6. A packaging machine for sealing two webs of film wrapped about an article, comprising: transporting means for longitudinally transporting an article with a first web of film on the upper surface of the article and a second web of film below the lower surface of the article, both of the webs having superposed marginal portions projecting laterally of the article; a housing disposed laterally adjacent said transporting means; an upper first and an upper second endless conveyor belt disposed in side by side, spaced apart relationship, laterally adjacent said transporting means; a lower first and a lower second endless conveyor belt disposed in side by side, spaced apart relationship, laterally adjacent said transporting means; a plurality of clamping surfaces provided on the outer surfaces of each of said belts respectively; driving means mounted to said housing for supporting and for positively driving each of said belts in synchronism without relative slippage and in synchronism with said transporting means; means provided on each of said belts for being supported and driven by said driving means; the lower run of said upper first belt being in vertical alignment with the upper run of said lower first belt, and the lower run of said upper second belt being in vertical alignment with the upper run of said lower second belt, said clamping surfaces of said belts having a common plane of abutment; an upper radiant heating means, mounted to said housing and disposed between said upper first and upper second belts above said plane of abutment; a lower radiant heating means mounted to said housing and disposed between said lower first and lower second belts below said plane of abutment; whereby as said transporting means transports the article and the webs, the projecting superposed marginal portions are seized and clamped between said belts, and are carried between said heating means, which melt a gap into said superposed portions and seal together the edges of the webs bounding on said gap.

7. A packaging machine for sealing two webs of film wrapped about an article, comprising: transporting means for longitudinally transporting an article with a first web of film on the upper surface of the article and a second web of film below the lower surface of the article, both of the webs having superposed marginal portions projecting laterally of the article; a housing disposed laterally adjacent said transporting means; an upper first and an upper second endless conveyor belt disposed in side by side, spaced apart relationship, laterally adjacent said transporting means; a lower first and a lower second endless conveyor belt disposed in side by side, spaced apart relationship, laterally adjacent said transporting means; a plurality of clamping surfaces provided on the outer surfaces of each of said belts respectively; driving means mounted to said housing for supporting and for positively driving each of said belts in synchronism without relative slippage and in synchronism with said transporting means, means provided on each of said belts for being supported and driven by said driving means; the lower run of said upper first belt being in vertical alignment with the upper run of said lower first belt, and the lower run of said upper second belt being in vertical alignment with the upper run of said lower second belt, said clamping surfaces of said belts having a common plane of abutment; an upper radiant heating means, mounted to said housing and disposed between said upper first and upper second belts above said plane of abutment; a lower radiant heating means mounted to said housing and disposed between said lower first and lower second belts below said plane of abutment; whereby as said transporting means transports the article and the webs, the projecting superposed marginal portions are seized and clamped between said belts, and are carried between said heating means, which melt a gap into said superposed portions and seal together the edges of the webs bounding on said gap; a first pulley mounted to said housing adjacent to the end of the lower run of said upper second belt; a second pulley mounted to said housing adjacent to the end of the upper run of said lower second belt; a third pulley mounted to said housing below said second pulley; an endless belt passing around said first and third pulleys, and deflected by said second pulley; whereby subsequent to said gap being formed in said marginal portions, the severed distal subportion of the webs is progressively seized between said second pulley and said belt and is carried around said second pulley, thereby removing said severed distal subportion of the webs from the wrapped article.

8. A packaging machine for sealing two webs of film wrapped about an article, comprising: transporting means for longitudinally transporting an article with a first web of film on the upper surface of the article and a second web of film below the lower surface of the article, both of the webs having superposed marginal portions projecting laterally of the article; a housing disposed laterally adjacent said transporting means; an upper first and an upper second endless conveyor belt disposed in side by side, spaced apart relationship, laterally adjacent said transporting means; a lower first and a lower second endless conveyor belt disposed in side by side, spaced apart relationship, laterally adjacent said transporting means; a plurality of clamping surfaces provided on the outer surfaces of each of said belts respectively, driving means mounted to said housing for supporting and for positively driving each of said belts in synchronism without relative slippage and in synchronism with said transporting means; means provided on each of said belts for being supported and driven by said driving means; the lower run of said upper first belt being in vertical alignment with the upper run of said lower first belt, and the lower run of said upper second belt being in vertical alignment with the upper run of said lower second belt, said clamping surfaces of said belts having a common plane of abutment; an upper radiant heating means, mounted to said housing and disposed between said upper first and upper second belts above said plane of abutment; a lower radiant heating means mounted to said housing and disposed between said lower first and lower second belts below said plane of abutment; whereby as said transporting means transports the article and the webs, the projecting superposed marginal portions are seized and clamped between said belts, and are carried between said heating means, which melt a gap into said superposed portions and seal together the edges of the webs bounding on said gap; said housing being traversable vertically with respect to said transporting means, whereby said plane of abutment may be varied to bisect the height of the article carried by said transporting means.

9. A packaging machine for sealing two webs of film wrapped about an article, comprising: transporting means for longitudinally transporting an article with a first web of film on the upper surface of the article and a second web of film below the lower surface of the article, both of the webs having superposed marginal portions projecting laterally of the article; a housing disposed laterally adjacent said transporting means; an upper first and an upper second endless conveyor belt disposed in side by side, spaced apart relationship, laterally adjacent said transporting means; a lower first and a lower second endless conveyor belt disposed in side by side, spaced apart relationship, laterally adjacent said transporting means; a plurality of clamping surfaces provided on the outer surfaces of each of said belts respectively, driving means mounted to said housing for supporting and for positively driving each of said belts in synchronism without relative slippage and in synchronism with said transporting means; means provided on each of said belts for being supported and driven by said driving means; the lower run of said upper first belt being in vertical alignment with the upper run of said lower first belt, and the lower run of said upper second belt being in vertical alignment with the upper run of said lower second belt, said clamping surfaces of said belts having a common plane of abutment; an upper radiant heating means, mounted to said housing and disposed between said upper first and upper second belts above said plane of abutment; a lower radiant heating means mounted to said housing and disposed between said lower first and lower second belts below said plane of abutment; whereby as said transporting means transports the article and the webs, the projecting superposed marginal portions are seized and clamped between said belts, and are carried between said heating means, which melt a gap into said superposed portions and seal together the edges of the webs bounding on said gap; said housing being traversable laterally with respect to said transporting means, whereby lateral spacing of said heating means from said article may be adjusted.

10. A packaging machine for sealing two webs of film wrapped about an article comprising: a first and a second spaced apart article conveyor belt for longitudinally transporting an article with a first web of film on the upper surface of the article and a second web of film below the lower surface of the article, both of the webs having two superposed marginal portions, each projecting respectively laterally of the article; a first housing disposed laterally adjacent said first article conveyor belt, and a second housing disposed laterally adjacent said second article conveyor belt; each said housing having adjacent said conveyor belts an upper first and an upper second endless web conveyor belt disposed in side by side, spaced apart relationship, a lower first and a lower second endless web conveyor belt disposed in side by side, spaced apart relationship, a plurality of clamping surfaces provided on the outer surfaces of each of said web conveyor belts respectively, the lower run of said upper first web conveyor belt being in vertical alignment with the upper run of said lower first web conveyor belt, and the lower run of said upper second web conveyor belt being in vertical alignment with the upper run of said lower second web conveyor belt, said clamping surfaces of said web conveyor belts having a common plane of abutment; driving means mounted to said housings for supporting and for positively driving each of said conveyor belts in synchronism without relative slippage and in synchronism with said transporting means; means provided on each of said web conveyor belts for being supported and driven by said driving means; an upper radiant heating means mounted to each respective housing and disposed between said upper first and upper second web conveyor belts above said plane of abutment; a lower radiant heating means mounted to each respective housing and disposed between said lower first and lower second web conveyor belts below said plane of abutment; whereby as first and second spaced apart article conveyor belts transport the article and the webs, the respective laterally projecting superposed marginal portions are seized and clamped between said web conveyor belts of each respective housing and are carried between said respective heating means, which melt a respective gap into said superposed portions and seal together the edges of the webs bounding on said gap.

11. A packaging machine for sealing two webs of film wrapped about an article comprising: a first and a second spaced apart article conveyor belt for longitudinally transporting an article with a first web of film on the upper surface of the article and a second web of film below the lower surface of the article, both of the webs having two superposed marginal portions, each projecting respectively laterally of the article; a first housing disposed laterally adjacent said first article conveyor belt, and a second housing disposed laterally adjacent said second article conveyor belt; each said housing having adjacent said conveyor belts an upper first and an upper second endless web conveyor belt disposed in side by side, spaced apart relationship, a lower first and a lower second endless web conveyor belt disposed in side by side, spaced apart relationship, a plurality of clamping surfaces provided on the outer surfaces of each of said web conveyor belts respectively, the lower run of said upper first web conveyor belt being in vertical alignment with the upper run of said lower first web conveyor belt, and the lower run of said upper second web conveyor belt being in vertical alignment with the upper run of said lower second web conveyor belt, said clamping surfaces of said web conveyor belts having a common plane of abutment; driving means mounted to said housings for supporting and for positively driving each of said conveyor belts in synchronism without relative slippage and in synchronism with said transporting means; means provided on each of said web conveyor belts for being supported and driven by said driving means; an upper radiant heating means mounted to each respective housing and disposed between said upper first and upper second web conveyor belts above said plane of abutment; a lower radiant heating means mounted to each respective housing and disposed between said lower first and lower second web conveyor belts below said plane of abutment; whereby as first and second spaced apart article conveyor belts transport the article and the webs, the respective laterally projecting superposed marginal portions are seized and clamped between said web conveyor belts of each respective housing and are carried between said respective heating means, which melt a respective gap into said superposed portions and seal together the edges of the webs bounding on said gap; means intercoupling said two housings for adjusting the lateral spacing between said housings.

12. A packaging machine for sealing two webs of film wrapped about an article comprising: a first and a second spaced apart article conveyor belt for longitudinally transporting an article with a first web of film on the upper surface of the article, both of the webs having two superposed marginal portions, each projecting respectively laterally of the article; a first housing disposed laterally adjacent said first article conveyor belt, and a second housing disposed laterally adjacent said second article conveyor belt; each said housing having adjacent said conveyor belts an upper first and an upper second endless web conveyor belt disposed in side by side, spaced apart relationship, a lower first and a lower second endless web conveyor belt disposed in side by side, spaced apart relationship, a plurality of clamping surfaces provided on the outer surfaces of each of said web conveyor belts respectively, the lower run of said upper first web conveyor belt being in vertical alignment with the upper run of said lower first web conveyor belt, and the lower run of said upper second web conveyor belt being in vertical alignment with the upper run of said lower second web conveyor belt, said clamping surfaces of said web conveyor belts having a common plane of abutment; driving means mounted to said housings for supporting and for positively driving each of said conveyor belts in synchronism without relative slippage and in synchronism with said transporting means; means provided on each of said web conveyor belts for being supported and driven by said driving means; an upper radiant heating means mounted to each respective housing and disposed between said upper first and upper second web conveyor belts above said plane of abutment; a lower radiant heating means mounted to each respective housing and disposed between said lower first and lower second web conveyor belts below said plane of abutment; whereby as first and second spaced apart article conveyor belts transport the article and the webs, the respective laterally projecting superposed marginal portions are seized and clamped between said web conveyor belts of each respective housing and are carried between said respective heating means, which melt a respective gap into said superposed portions and seal together the edges of the webs bounding on said gap; means intercoupling said two housings and said article conveyor belts for concurrently adjusting the lateral spacing between said housings and between said article conveyor belts.

13. A packaging machine for wrapping articles in a film of thermoplastic material, comprising: means for sequentially supporting a plurality of articles and for supplying a first web of film to the upper surfaces of each article and for supplying a second web of film to the lower surface of such article, which webs are initially joined together along the cross-web axis, and each have at least a portion thereof respectively projecting behind the trailing edge of each preceding article and projecting ahead of the leading edge of each next succeeding article; a path along which the articles and the respective webs are transported; means for sequentially transporting each article and respective webs along at least the initial portion of said path; a plurality of upper heat sealer bars and a like plurality of lower heat sealer bars, each disposed along the cross-web axis; means for sequentially traversing a respective one of each of said upper and lower bars together between the respective trailing edge of the preceding article and the respective leading edge of the next succeeding article, clamping the portions of the webs together for melting a gap therein along the cross-web axis and for joining the superposed edges of the webs bounding the gap, for traversing said clamped together bars along said path for transporting the articles and webs along the remainder of said path, and for traversing said bars apart for releasing the articles and webs.

14. A packaging machine for wrapping articles in a film of thermoplastic material, comprising: means for sequentially supplying a plurality of articles and for supplying a first web of film to the upper surface of each article and for supplying a second web of film to the lower surface of such article, which webs are initially joined together along the cross-web axis, and which articles are sequentially spaced apart between the webs; a path along which the articles and the webs are transported; means disposed adjacent the initial portion of said path comprising a plurality of elements which are sequentially traversed along said initial portion of said path, each element being respectively initially projected into said path behind a respective article for transporting such article and webs along said initial portion of said path, and subsequently retracted from said path and from behind such respective article to release such article at the end of said initial portion of said path; a plurality of upper heat sealer bars and a like plurality of lower heat sealer bars, each disposed along the cross-web axis; means for sequentially traversing a respective one of each of said upper and lower bars together between each of the sequentially spaced apart articles trailing the respective projected element, clamping the adjacent portion of the webs together therebetween for melting a gap therein along the cross-web axis and for joining the superposed edges of the webs bounding the gap, for traversing said clamped together bars along said path for transporting the articles and webs along the remainder of said path, and for traversing said bars apart for releasing the articles and the webs.

15. A packaging machine for wrapping articles in a film of thermoplastic materials comprising: means for sequentially supplying a plurality of articles and for supplying a first web of film to the upper surface of each article and for supplying a second web of film to the lower surface of such article, which webs are initially joined together along the cross-web axis, and which articles are sequentially spaced apart between the webs; a path along which the articles and the webs are transported; a first housing disposed adjacent the initial portion of said path; an endless first carrier supported for movement with respect to and by said first housing, which carrier has a run which is adjacent said initial portion of said path; a plurality of first carriages mounted to said carrier at a uniform spacing therealong, each carriage having an element mounted thereto which is operable to be projected out from said carriage into said path when said carriage is adjacent said initial portion of said path, and to be retracted out of said path subsequently; means for projecting each said element into said path when said respective carriage is adjacent said initial portion, and for maintaining said element projected as said respective carriage is carried along adjacent said initial portion of said path by said carrier; means for retracting each said element after said respective carriage has been carried a predetermined distance along said initial portion of said path; a second housing disposed adjacent one side of said path, having an endless second carrier supported for movement with respect to and by said second housing, which carrier has a run which is adjacent to and above said path, and having an endless third carrier supported for movement with respect to and by said second housing, which carrier has a run which is adjacent to and below said path; a third housing disposed adjacent the other side of said path, having an endless fourth carrier supported and for movement with respect to and by said fourth housing, which carrier has a run which is adjacent to and above said path, and having an endless fifth carrier supported for movement with respect to and by said third housing, which carrier has a run which is adjacent to and below said path; a plurality of second carriages mounted to said second carrier at a uniform spacing therealong, a plurality of third carriages mounted to said third carrier at uniform spacing therealong, a plurality of fourth carriages mounted to said fourth carrier at uniform spacing therealong, a plurality of fifth carriages mounted to said fifth carrier at uniform spacing therealong; a plurality of upper heat sealer bars, each disposed along the cross-web axis and supported to and between a respective second carriage and a fourth carriage; a plurality of lower heat sealer bars, each disposed along the cross-web axis and supported to and between a respective third carriage and a fourth carriage, a respective upper bar and a respective lower bar being in alignment as they are traversed by their carriers, means for projecting each sealer bar towards said path when said respective bar is adjacent the end of said initial portion of said path whereat said projecting elements are retracted, whereby an aligned pair of upper and lower sealer bars are traversed together between two successive, spaced apart articles, trailing the respective element, clamping the adjacent portions of the webs together therebetween for melting a gap therein along the cross-web axis and for joining the superposed edges of the webs bounding the gap, and for retracting said bars apart for releasing the articles and the webs after said bars have been carried a second predetermined distance along said path.

16. A packaging machine according to claim 15 further including means to adjustably preset the plane of abutment between said respective aligned upper and lower sealer bars.

17. A packaging machine according to claim 15 wherein said first housing is adjacent one side of said path, and an additional, similar housing, with a similar carrier, carriages and elements is provided adjacent the other side of said path in symmetrical alignment with the carrier, carriages and elements of said first housing.

18. A method of packaging a plurality of articles, comprising: advancing the article sequentially and continuously in the machine direction; providing two webs of thermoplastic material respectively above and below each article; clamping the two webs together sequentially between each article and the next preceding article, melting a gap along the cross-web axis in the clamped together webs and joining the superposed edges of the webs bounding the gap, all concurrently with the continuous movement of the article in the machine direction; progressively clamping the two webs together along the machine-axis adjacent at least one lateral edge of the article, progressively melting a gap in the clamped together webs and joining the superposed edges of the webs bounding the gap, all concurrently with the continuous movement of the article in the machine direction.

19. A method of packaging a plurality of articles, comprising: advancing the article sequentially and continuously in the machine direction and providing two webs of thermoplastic material respectively above and below each article; clamping together along the cross-web axis the peripheries of two superposed portions respectively in each web between each article and the next preceding article, melting a gap through the clamped together portions and joining the superposed edges of the portions bounding the gap, all concurrently with the continuous movement of the article in the machine direction; progressively clamping together along the machine-axis the peripheries of two superposed portions respectively in each web adjacent at least one lateral edge of each article, progressively melting a gap in the clamped together portions and joining the superposed edges of the portions bounding the gap, all concurrently with the movement of the article in the machine direction.

References Cited

UNITED STATES PATENTS

| | | | |
|---|---|---|---|
| 3,015,381 | 1/1962 | Mohwinkel et al. | 198—203 |
| 3,230,687 | 1/1966 | Nutting et al. | 53—180 |
| 3,237,371 | 3/1966 | Gerlach | 53—182 |
| 3,355,857 | 12/1967 | Tobey | 53—182 |
| 2,639,567 | 5/1953 | Murdoch et al. | 53—182 X |
| 2,931,148 | 4/1960 | Smith | 53—182 X |
| 2,987,107 | 6/1961 | Sylvester et al. | 53—182 X |
| 3,011,934 | 12/1961 | Bursak | 53—180 X |
| 3,158,973 | 12/1964 | Monaghan | 53—66 |
| 3,191,356 | 6/1965 | Zelnick et al. | 53—182 |

TRAVIS S. McGEHEE, Primary Examiner

U.S. Cl. X.R.

53—182, 372; 198—92